(12) United States Patent
Troibner et al.

(10) Patent No.: US 6,466,251 B1
(45) Date of Patent: Oct. 15, 2002

(54) AUTOMATIC ISDN SWITCH

(75) Inventors: Manfred Wilhelm Troibner, 4785 Clague Rd., North Olmsted, OH (US) 44070; Randall William Zinn, Westlake, OH (US)

(73) Assignee: Manfred Wilhelm Troibner, North Olmsted, OH (US)

( * ) Notice: Subject to any disclaimer, the term of this patent is extended or adjusted under 35 U.S.C. 154(b) by 0 days.

(21) Appl. No.: 09/379,096

(22) Filed: Aug. 23, 1999

(51) Int. Cl.[7] .................................................. H04N 7/14
(52) U.S. Cl. ...................... 348/14.8; 379/202; 370/260; 370/261
(58) Field of Search .............................. 348/14, 15, 16; 379/93.14, 202; 370/260, 261, 259, 262, 524

(56) References Cited

U.S. PATENT DOCUMENTS

| | | |
|---|---|---|
| 5,591,984 A | 1/1997 | Drucker |
| 5,818,513 A | 10/1998 | Sano et al. |
| 5,861,907 A | 1/1999 | Wada |
| 5,987,009 A * | 11/1999 | Awazu ........................ 370/260 |

FOREIGN PATENT DOCUMENTS

| | | | |
|---|---|---|---|
| FR | 2 709 628 | 9/1993 | |
| JP | 410164538 A * | 6/1998 | ............ H04N/7/14 |
| WO | 99/16178 | 4/1999 | |

OTHER PUBLICATIONS

RelCom Automatic Line Routing Switch product information, http://www.relcomtech.com/, Accessed Oct. 5, 1999.
Covid CVD 5300 ISDN Matrix Switches product information, http://www.covid.com/cvd5300.html, Accessed Sep. 9, 1999.
Covid Switchers product information, http://www.covid.com/switchers.html, Accessed Aug. 23, 1999.

(List continued on next page.)

Primary Examiner—Curtis Kuntz
Assistant Examiner—Melur Ramakrishnaiah
(74) Attorney, Agent, or Firm—Calfee, Halter & Griswold LLP

(57) ABSTRACT

An automatic ISDN switch for connection to at least one ISDN-BRI line and a plurality of different videoconferencing locations for automatically switching the at least one ISDN-BRI line to one videoconferencing location of the plurality of different videoconferencing locations, comprising: a control unit for being placed in circuit communication with each of the plurality of different videoconferencing locations, the control unit generating a location signal corresponding to a particular one videoconferencing location of the plurality of videoconferencing locations; and a switch bank in circuit communication with the control unit for receiving the location signal, for being placed in circuit communication with the plurality of different videoconferencing locations, and further for being placed in circuit communication with the at least one ISDN-BRI line, said switch bank automatically switching the at least one ISDN-BRI line to the particular one videoconferencing location of the plurality of videoconferencing locations corresponding to the location signal generated by the control unit. In one embodiment of the present invention, an automatic ISDN switch automatically determines the location of the target videoconferencing location and switches the incoming ISDN-BRI lines to the target location without requiring any manual routing of ISDN-BRI lines. In another embodiment of the present invention, an automatic ISDN switch is in circuit communication with an external communication device via a communications link, with which a user causes the switch to automatically switch the incoming ISDN-BRI lines to the target location without requiring any manual routing of ISDN-BRI lines. Both embodiments eliminate the need for manual patch panels and dedicated, costly ISDN-BRI lines to all locations.

6 Claims, 14 Drawing Sheets

OTHER PUBLICATIONS

Covid CVD 5314 ISDN Matrix Switches product information, http://www.covid.com/cvd5300.html, Accessed Sep. 3, 1999.

Covid Videoconferencing Products information, http://www.covid.com/video_con.html, Accessed Sep. 9, 1999.

Covid CVD 5314 Autosensing ISDN Matrix Switch product information, *TELECONFERENCE*, Sep.–Oct. 1999, p. 65.

Covid CVD 5300 Series ISDN Matrix Switches product information.

Covid 5300 ISDN Matrix Switches product description.

*Special Edition: Using ISDN*, by James Y. Bryce, 1995, Que Corporation, pp. 81–95.

"Chapter 8: Wiring and Powering Your ISDN System" *Special Edition: Using ISDN*, by James Y. Bryce, 1995, Que Corporation, pp. 185–214.

"Visual Communication System in Closed Areas Using an Extended ISDN Protocol" by Kojima, et al., *Digest of Technical Papers of the International Conference on Consumer Electronics (ICCE)*, IEEE, Jun. 21, 1994, pp. 170–171.

PCT International Search Report for International Application Number PCT/US00/22980, mailed Dec. 12, 2000.

"MX2206RM: 6–in 1–out RGBS Auto Switcher" Product Information, http://www.altinex.com/Solutions/switchers/mx2206rmcenter.htm, Jan. 19, 2001.

"MX2206RM 6–In, 1–Out RGBS Auto Switcher User's Guide", Altinex, Inc.

"6–in 1–out RGBS Auto Switcher MX2206RM" Product Information, Altinex, Inc.

"RS–232 Control" Product Information, Altinex, Inc.

"Miscellaneous Cables" Product Information, http//www.altinex.com/Solutions/cables/MiscCablescenter.htm, Jan. 19, 2001.

"Miscellaneous Cables" Product Information Altinex, Inc.

"DA1916SX: 2–in 1–out VGA Auto Switcher with Loop Output" Product Information, http://www.altinex.com/Solutions/switchers/da1916sxcenter.htm, Mar. 22, 2001.

"2–in 1–out VGA Switcher w/Loop Output DA1916SX" Product Information, Altinex, Inc.

"DA1916SX 2–In, 1–Out VGA Auto–Switcher With Loop Output User's Guide", Altinex, Inc.

"RC5203CC: Contact Closure Switch for ALTINEX Auto Switchers (DA1914SX, DA1916SX, DA1917SX)" Product Information, http://www.altinex.com/Solutions/accessories/rc5203cccenter.htm, Mar. 22, 2001.

"DA1917SX: 2–in 2–out VGA Auto Switcher/Distribution Amplifier" Product Information, http://www.altinex.com/Solutions/switchers/da1917sxcenter.htm, Mar. 22, 2001.

"2–in 2–out VGA Auto Switcher/Dist. Amp DA1917SX" Product Information, Altinex, Inc.

"DA1917SX 2–In, 2–Out VGA Autoswitcher/Distribution Amplifier User's Guide", Altinex, Inc.

\* cited by examiner

AUTOMATIC ISDN SWITCH

FIELD OF THE INVENTION

The present invention relates generally to switching of communication signals, e.g., integrated services digital network ("ISDN") signals. A preferred embodiment of the present invention is an automatic ISDN switch that automatically detects the presence of an ISDN device at one of a plurality of locations and automatically routes all audio, video, and data to that one location while locking out all of the other locations connected to the switch. The ISDN switch of the present invention has numerous applications, including by way of example videoconferencing using a 128 kbps (128,000 bits per second), 256 kbps, 384 kbps, or 512 kbps ISDN configuration.

BACKGROUND OF THE INVENTION

Videoconferencing has recently undergone an evolution. Prior to this evolution, videoconferencing equipment was typically semi-permanently installed in a dedicated location with dedicated, permanently installed communication lines. The recent evolution took the form of making videoconferencing equipment mobile. In the past few years, most videoconferencing equipment on the market has been marketed as being mobile and by far the majority of videoconferencing systems sold over the past few years have been mobile systems.

There are a number of standard communications methodologies that can be used in videoconferencing. Currently, the most widely used videoconferencing communications medium in the United States and internationally is ISDN, which is the basis for a number of different specific communications configurations. One ISDN videoconferencing communications family of standards is known as H.320 (ITU-T) promulgated by the International Telecommunications Union (formerly known as CCITT). One implementation allows 384 kbps transmission of information using three individual ISDN-BRI (Integrated Services Digital Network-Basic Rate Interface) telephone lines. This form of videoconference transmission is also known or described as "six-channel transmission" in the videoconference industry, because it uses six ISDN channels, each of which carry 64 kbps of digital information. Each ISDN-BRI telephone line includes two separate 64 kbps lines or channels, as they are referred to in the videoconferencing industry. The H.320 standard encompasses video (e.g., videoconferencing), audio, and control using one or more 64 kbps ISDN lines. A majority of corporate videoconferencing installations currently use six 64 kbps ISDN lines, using three two-channel ISDN-BRI lines; while other applications such as medical videoconferencing applications use as many as eight 64 kbps ISDN lines.

One obvious benefit of using mobile ISDN videoconferencing equipment is that one videoconferencing unit can be used at a number of locations in the same facility. However, connecting ISDN devices to an ISDN line is complicated by the fact that ISDN lines must be properly terminated with an industry standard network U-interface, such as an NT-1, an NT-3, or a Triple NT-1. Only a single device (more specifically a U-interface) may be connected to a BRI line. Businesses requiring use of ISDN lines in more than one location have had two acceptable prior art options: (i) installing multiple data lines for each possible location or (ii) installing a patch panel at the point of termination with which one can physically manipulate the termination point of the ISDN line(s). A third prior art option, daisy-chaining, is not an acceptable option because it has problems of signal quality consistency, security, and accessibility, as will be discussed below.

The first prior art option, installing multiple data lines for each possible location, is very costly and inconvenient. One implementing the first prior art option would be charged for the installation of each set of three ISDN lines (recall that with the majority of corporate or industrial videoconferencing installations—as compared to typical home usage—each location requires access to three two-channel BRI telephone lines), the digital monthly services charges for each set of three ISDN lines for each location, even when lines are not used, and the cost of the (3) CAT-5 wires to each location beyond the initial point of termination. Thus, to implement this first option using current wiring standards, it is necessary to run multiple data lines from the point of presence (the phone room in typical installations) to each possible destination. If, for example, a 384 kbps ISDN configuration were to be needed in 3 different rooms, it would be necessary for a total of 9 data lines be run (3 ISDN 2 channel lines from point of presence to destination). The cost and type of cabling must be considered for such an implementation; expensive CAT-5 or CAT-6 wiring is specified. The cost of this option can become prohibitive with only a few locations. Moreover, under these stringent installation methods, flexibility of conference locations is not an option due to the fact that the wiring must be permanently installed.

Additionally, the first prior art option is inconvenient to use with a mobile videoconferencing unit. As known to those in the art, each videoconferencing system has an ISDN network interface (e.g., an NT-1, an NT-3 or an Triple NT-1) that acts to terminate the ISDN line(s) used in that system and an ISDN video codec. Each 64 kbps ISDN line has its own unique telephone number. As also known to those in the art, the ISDN video codec must be programmed with the telephone number(s) for each ISDN line(s) used. Thus, moving a mobile videoconferencing unit from one location to another requires that six telephone numbers be programmed into the ISDN video codec, which typically must be done by busy MIS personnel. At least one ISDN video codec in the art, i.e., a unit from Polycom Inc., includes software that attempts to automatically detect the phone numbers associated with the ISDN lines and program those numbers into the video codec. However, this autodetection process can take 5–10 minutes and is not always successful; the system might fail to detect the telephone numbers. Also, executing the autodetection process still typically requires MIS personnel to perform.

The second prior art option is to install a patch panel in the telephone closet or another location with which one can physically manipulate the termination point of the ISDN line(s). This option has a great deal more flexibility than the first option, in that one can wire multiple rooms for access and simply 'patch' the data lines to the destination at the time of need; however, it suffers from relatively high cost and is inconvenient as well.

More specifically, the second option requires that all communication lines be brought to the point of presence and terminated in a patch bay. Located near the incoming patch bay, typically underneath, is a patch panel. Simply put, the electrical connection between the patch bay and the patch panel resembles the old switchboard banks that telephone operators would use to directly electrically connect a caller to a destination. The same antiquated manual process used to route telephone calls, before and during the 1950's is currently used to route ISDN lines with the patch panel. Because ISDN technology requires termination at each end to properly operate, the patch panel routes the ISDN lines to a single termination point and isolates all other signal access locations. The patch panel has the benefit of giving the user security, in that the data lines can only be connected to a single destination; therefore, eavesdropping through another room is not possible. Another advantage of the patch bay over the first prior art option is that there is flexibility in provisioning data lines; more data lines can be added without changing the wiring plant. In the alternative, manual switches are used instead of the manual patch panel in this prior art option.

There are difficulties with the patch panel method of connecting ISDN lines as well. One of the primary drawbacks of using a patch panel to route ISDN lines to various destination locations is inconvenience. Switching the ISDN lines from one location to another requires that a technically capable person be notified and available, in advance, when and where an ISDN line is needed so that the appropriate cables can be manually connected or switched ahead of time. Another primary concern is cost of implementation. It is still necessary for a videoconferencing application implemented with this second option, using current videoconferencing wiring conventions, to run multiple data lines to each possible location. Yet another concern is that an error in patching can prevent the system from functioning at all.

One common method of connecting multiple devices to a single line, daisy-chaining, is not a realistic option for ISDN lines, because of termination issues. This issue can be understood in contrast to the plain old telephone system (POTS).

In a normal home telephone environment, using POTS telephone lines, it is common practice to attach multiple telephones to a single line by connecting them one to another in a daisy chain format. Daisy-chaining devices causes several potential problems, such as an obvious decrease in sound volume. This is acceptable when using ordinary telephones connected to POTS telephone lines because human ears are much more flexible and less demanding than computer equipment, i.e., our ears can still understand what is being said despite changes in signal quality and volume caused by daisy-chaining. The termination point can be at any telephone connected to the POTS telephone line, and can change from usage to usage as different handsets are used. Thus, with ordinary telephones connected to POTS telephone lines, the termination (or end point of the wire) does not have to be defined in advance as long as certain minimum requirements are made (e.g., limiting the total number of devices daisy chained together). In addition to changes in signal quality and volume, daisy-chaining causes other problems. For example, when a conversation is taking place on the telephone, it is possible to eavesdrop by picking up another extension. Another concern is that a physically damaged wire or jack can prevent all telephone sets after that point from functioning.

These problems with daisy-chaining are a great deal more pronounced with a digital protocol, such as ISDN. The signal sensitivity in a digital line must be constantly maintained in order for accurate and consistent data transmissions to take place. If, during a videoconferencing session at one location, another videoconferencing unit is connected to the same ISDN line, the signal loss caused by that other connection being made (made possible only because of the inadvised use of daisy-chaining) may cause one or more channels to be lost, or the entire call to be disconnected. Also, ISDN lines must have a fixed, predetermined termination point. Unlike the procedure for ordering a standard home telephone line, when provisioning (or ordering) a digital ISDN line one is required to specify a single termination point for that ISDN line for the installation to occur.

SUMMARY OF THE INVENTION

According to the present invention, an automatic ISDN switch is provided that avoids the need for patch panels, costly dedicated ISDN lines to all locations, and use of MIS personnel to switching patch panel wires. The present invention also includes a novel wiring configuration that significantly reduces the cost of wiring ISDN installations.

According to one aspect of the present invention, an automatic ISDN switch automatically determines the location of the target videoconferencing location and switches the incoming ISDN lines to the target location without requiring any manual routing of ISDN lines. The ISDN switch of the present invention comprises a switch bank in circuit communication with a control unit. In short, the control unit determines to which location the ISDN line(s) from the telephone company should be switched, and the switch bank switches the ISDN line(s) from the telephone company to a particular location. In a first embodiment, the control unit comprises autodetect logic that automatically detects the location of videoconferencing equipment and transmits a signal to the switch bank indicating to which location signal the ISDN line(s) from the telephone company should be switched. The autodetect logic can use any number of ways of detecting the location to which the ISDN line(s) from the telephone company should be switched, including by way of example, but not of limitation, detecting that a connector has been inserted into a receptacle, detecting that two conductors have been electrically shorted, detecting that the impedance between two conductors has changed, detecting that the electrical characteristics of at least one conductor have changed, detecting that videoconferencing equipment at a particular location has been powered up, a particular telephone extension being dialed from the particular location, etc. The control unit can be connected to the various locations by any suitable connection, e.g., by way of example but not of limitation, via one or more of the following circuit communications means: one or more conductor(s), connector(s), computer network(s), fiber optic link(s), optical signals(s), radio signal(s), electromagnetic signal(s), telephone line(s), sonic link(s), ISDN lines, hybrid ISDN lines, existing Ethernet cable(s), power line(s) (using, e.g., an X-10 interface), etc.

In a second embodiment of the present invention, the control unit comprises a communication circuit supporting a communications link to a communications device to allow a user to directly select the location to which the ISDN line(s) from the telephone company should be switched, including by way of example, but not of limitation: a keypad located in one or more locations to which ISDN line(s) from the telephone company could be switched (e.g., videoconferencing locations), a pass key reader in one or more of the locations, a keypad located on the enclosure for the control unit and/or the switch bank, a keypad at a location different from where the control unit and/or switch bank are located and different from the one or more locations, a telephone extension through which a user might select the particular location, a computer terminal through which a user might select the particular location, a web site through which a user might select the particular location, an electromagnetic link through which a palmtop computer might be used to select the desired location, etc. The control unit can be connected to the communications device by any suitable connection, e.g., by way of example but not of limitation, via one or more of the following circuit communications means: one or more conductor(s), connector(s), computer network(s), fiber optic link(s), optical signal(s), radio signal(s), electromagnetic signal(s), telephone line(s), sonic link(s), ISDN lines, hybrid ISDN lines, existing Ethernet cable(s), power line(s) (using, e.g., an X-10 interface), etc.

Any combination of one or more of the implementations of the first embodiment can be combined with any combination of one or more of the implementations of the second embodiment to provide enhanced functionality.

According to the novel wiring configuration of the present invention, two or more ISDN lines are used with a single cable. In one embodiment, a plurality of ISDN-BRI lines are combined on a single hybrid line to provide enhanced throughput. These lines are "hybrid" in the sense that they ignore industry standard wiring conventions (AT&T Bell Laboratories Std. No. 568-B for videoconferencing) for CAT-5 and CAT-6 wiring used in an ISDN videoconferencing application; i.e., more than one ISDN-BRI line is passed through a single CAT-5 or CAT-6 single cable. In the case of a 384 kbps videoconferencing system, the three ISDN-BRI lines (six 64 kbps lines) can be passed through six of the eight available conductors in a CAT-5 or CAT-6 cable (or a cable suitable for Ethernet applications), leaving two lines for the autodetect logic and/or the communication circuit in the control unit. The novel wiring convention of the present invention arose out of an awareness that, using wiring conventions for videoconferencing, a major impediment to the marketing and installation of videoconferencing systems is the cost and complexity associated with installing new wiring required with typical videoconferencing installations. This awareness, coupled with a knowledge that most conference rooms and offices are wired with a single unshielded twisted pair ("UTP", which actually has four such twisted pairs) cable for Ethernet applications, and that that Ethernet cable is rarely used in conference rooms, and further coupled with insight that UTP cables suitable for Ethernet applications would also be suitable for a plurality 64 kbps ISDN lines in violation of vidoeconferencing wiring conventions, led to the concept of using the hybrid ISDN lines of the present invention. Thus, according to the present invention, existing UTP wiring found in most conference rooms could be used as-is for 384 kbps or 512 kbps videoconferencing applications.

The novel wiring configuration of the present invention can be used for any number of applications requiring more than two 64 kbps ISDN lines. For example, in the case of a 512 kbps medical application, four ISDN-BRI lines (eight 64 kbps lines) can be passed through the eight available conductors in a CAT-5 or CAT-6 cable (or cable for Ethernet applications), and the autodetect logic and/or the communication circuit in the control unit must use another communication path (e.g., telephone lines, RF signal, etc.) to either autodetect or receive a communication about the desired location, unless some of the eight available conductors in the CAT-5 or Ethernet cable are used for both detection and the ISDN signals.

It is therefore an advantage of the present invention to provide an ISDN switch that does not require human intervention in the form of manually switching one or more ISDN lines to a particular location.

It is therefore another advantage of the present invention to provide an ISDN switch that automatically detects a location requiring the use of one or more ISDN lines.

It is a further advantage of this invention to provide an ISDN switch that automatically detects a location requiring the use of one or more ISDN lines and that automatically switches the ISDN lines to that location without requiring any manual routing, patching, or switching of ISDN lines.

It is yet another advantage of the present invention to allow a significant cost savings by using hybrid ISDN lines in which more than one ISDN signal is passed through a single ISDN cable.

It is still another advantage of the present invention to allow a significant cost savings by using hybrid ISDN lines in which more than one ISDN signal is passed through an existing cable for use in an Ethernet application.

It is further still another advantage of the present invention to allow a significant cost savings by allowing all three ISDN-BRI lines in a 384 kbps videoconferencing application to be passed through a single CAT-5 or CAT-6 cable.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 8b is a front view of the front panel of the ISDN switch of FIGS. 4 and 7–8a;

DETAILED DESCRIPTION OF THE PREFERRED EMBODIMENT

Figure 1:
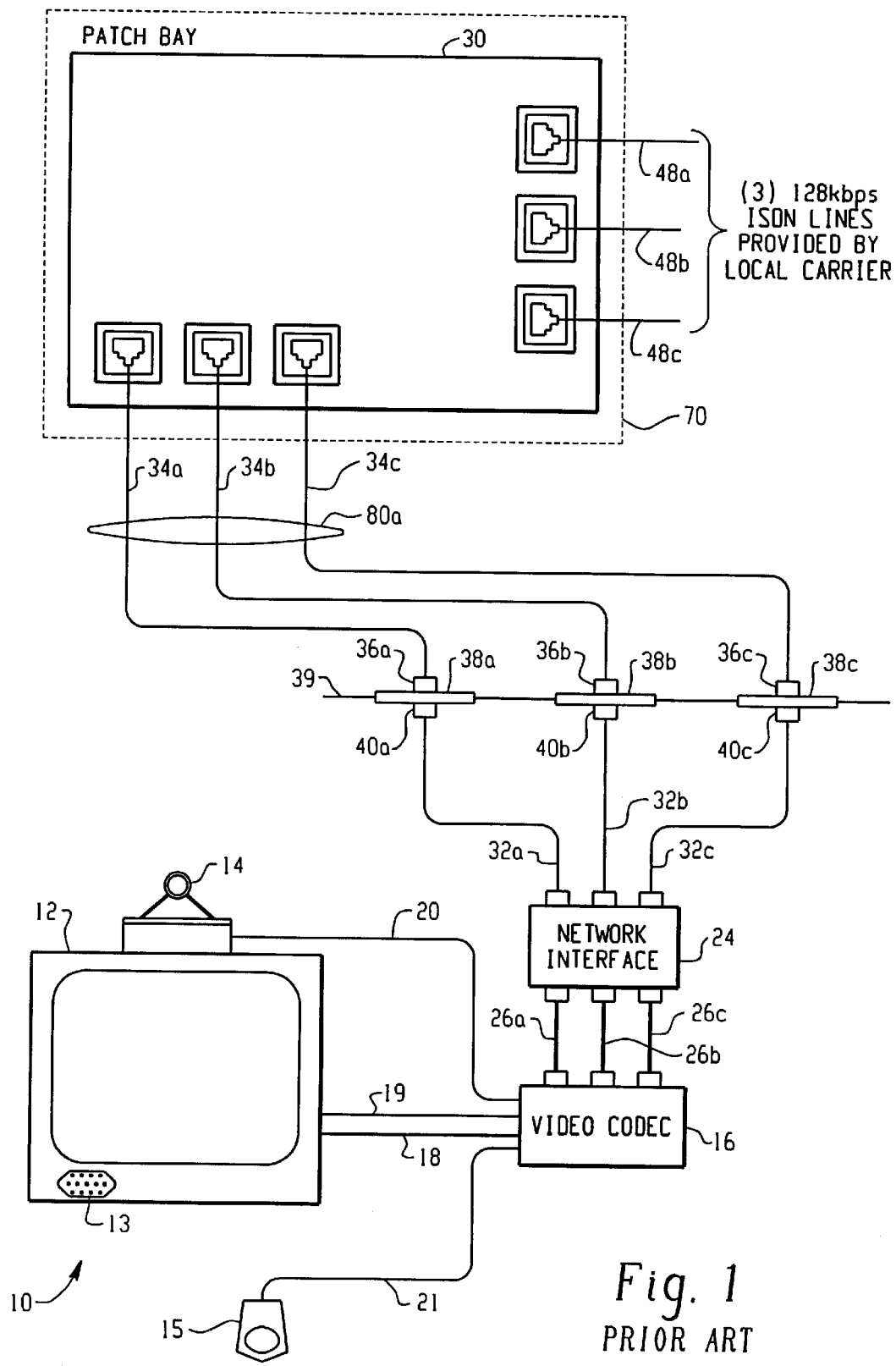
FIG. 1 is a schematic block diagram of a very basic, semi-permanently installed prior art 384 kbps videoconferencing system.

Before describing the details of the present invention, a description of several generic prior art videoconferencing systems may be helpful in understanding the advantages of the automatic ISDN switch of the present invention. Reference is had, therefore, to FIG. 1, which shows the very basic, semi-permanently installed prior art 384 kbps videoconferencing system 10. The videoconferencing system 10 includes a monitor 12, at least one speaker 13, a camera 14, and a microphone 15 in circuit communication with a video encoder/decoder ("codec") 16 via connections 18, 19, 20, and 21, respectively, as is known to those skilled in the art.

"Circuit communication" as used herein is used to indicate an communicative relationship between devices. Direct electrical and optical connections and indirect electrical and optical connections are examples of circuit communication. Two devices are in circuit communication if a signal from one is received by the other, regardless of whether the signal is modified by some other device. For example, two devices separated by one or more of the following—transformers, optoisolators, digital or analog buffers, analog integrators, other electronic circuitry, fiber optic transceivers, or even satellite—are in circuit communication if a signal from one reaches the other, even though the signal is modified by the intermediate device(s). As a final example, two devices not directly connected to each other, but both capable of interfacing with a third device, e.g., a CPU, are in circuit communication.

The codec 16 is in circuit communication with an ISDN network interface 24 via three ISDN lines 26a–26c. The codec 16 is a videoconference system codec and encodes all out-going audio, video, and data signals and decodes all incoming audio, video, and data signals. The codec 16 encodes the electrical signals representing the visual image captured by the camera 14 and the audio received by the microphone 15. The codec 16 also simultaneously decodes encoded visual signals and encoded audio signals received via the network interface 24 to generate the video signal on line 18 displayed by monitor 12 and the audio signal on line 19 played by speaker 13. The network interface 24 (e.g., NT-1, NT-3 or Triple NT-1) is in circuit communication with a patch bay 30 via three ISDN lines 32a–32c and three ISDN lines 34a–34c. The ISDN lines 32a–32c are connected to ISDN lines 34a–34c via RJ-45 wall-jack connectors 36a–36c passing through wall plates 38a–38c in wall 39. RJ-45 connectors 40a–40c connected to the end of line 32a–32c complete the circuit communication to the RJ-45 wall-jack connectors 36a–36c.

The patch bay 30 is typically located in a telephone closet or computer control room and provides an interface for three ISDN-BRI lines 48a–48c provided by the local carrier. The ISDN lines 32a–32c, 34a–34c, and 48a–48c are all an ISDN U interface. The three ISDN lines 26a–26c are an ISDN S/T interface. The network interface 24 converts the ISDN U interface into an ISDN S/T interface.

The prior art system 10 in FIG. 1 is a single location system. The ISDN lines 32a–32c, 34a–34c, and 48a–48c are the only lines to which the system 10 can be connected. To implement the first option for a prior art multiple location system—installing multiple data lines for each possible location—one merely duplicates particular components of FIG. 1 (ISDN lines 34a–34c and 48a–48c; RJ-45 wall-jack connectors 36a–36c; patch bay 30; and wall plates 38a–38c) for each location. A single, larger patch bay can be used to support multiple locations.

Figure 2:
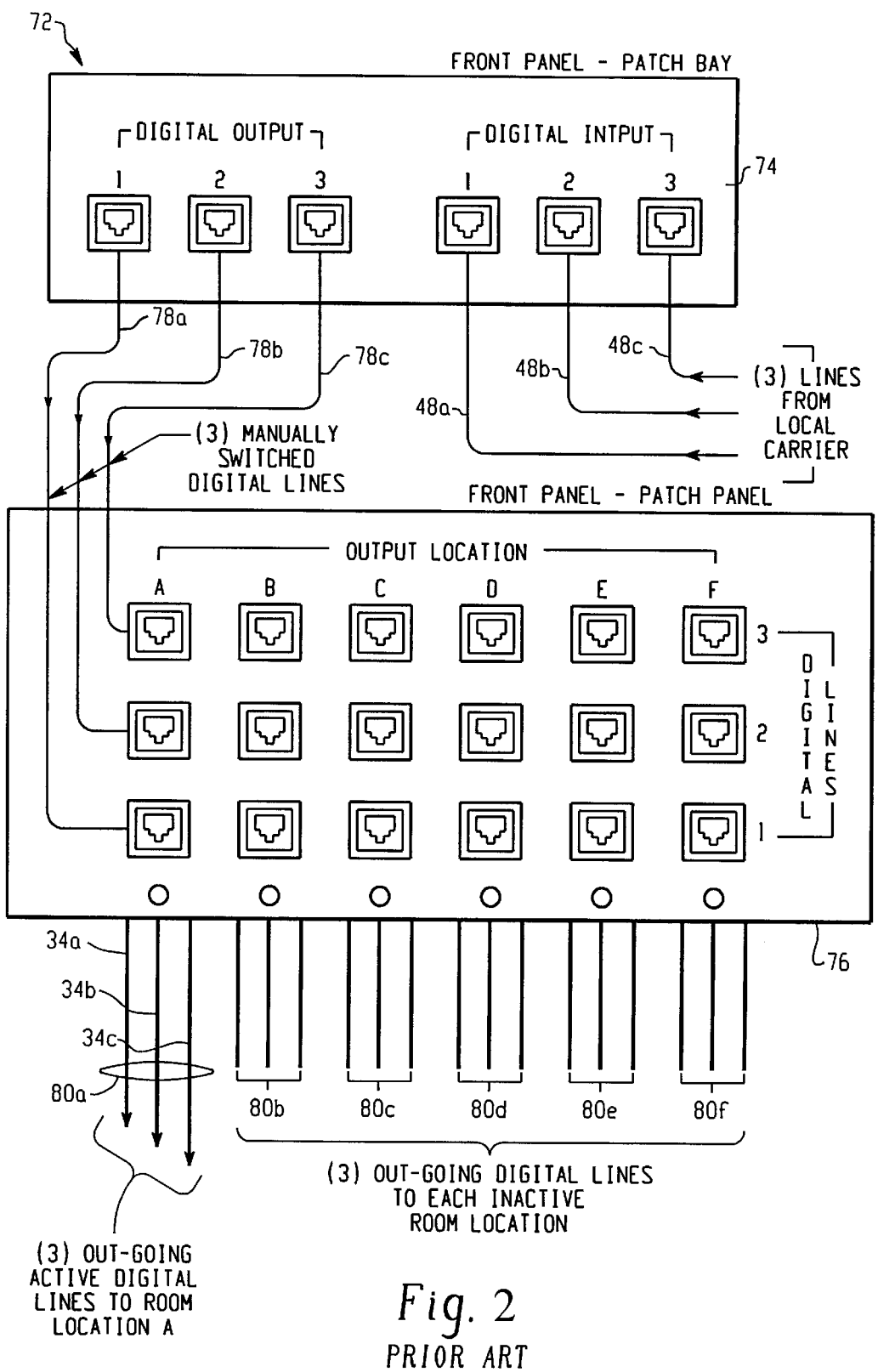
FIG. 2 is a schematic block diagram of a prior art multiple location system implementing a prior art option for using one videoconferencing system at multiple locations—installing a patch panel at the point of termination with which one can physically manipulate the termination point of the ISDN line(s)

Referring now to FIG. 2, there is shown a prior art multiple location system implementing the second prior art option—installing a patch panel at the point of termination with which one can physically manipulate the termination point of the ISDN line(s). The system of FIG. 2 is similar in many respects to the system in FIG. 1, except (i) the single line patching area 70 in FIG. 1 is replaced by a multiple line patching area 72 of FIG. 2 and (ii) the videoconferencing equipment (monito, speaker, camera, microphone, video codec, network interface, and associated connections; all not shown in FIG. 2) is mobile in the system in FIG. 2 rather than being semi-permanently installed as in FIG. 1.

The multiple line patching area 72 of FIG. 2 has a patch bay 74 that is identical to patch bay 30 in FIG. 1, and a patch panel 76, not found in the system of FIG. 1. As in FIG. 1, three incoming ISDN-BRI lines 48a–48c provided by the local carrier are connected to the patch bay 74. These ISDN-BRI lines are in circuit communication between the patch bay 74 and the patch panel 76 as three manually switchable ISDN-BRI patch cables 78a–78c. The patching area 72 of FIG. 2 has six groups of three ISDN-BRI output lines 80A–80F. The three ISDN-BRI lines routed to location A (80A) are shown as 34a–34c (as in FIG. 1) and the wiring between the patching area 72 and the wall plates (not shown in FIG. 2) are identical to that shown in FIG. 1 for each location. The mobile video conferencing equipment can be moved to as to be connected at location A to lines 80A, at location B to lines 80B, at location C to lines 80C, at location D to lines 80D, at location E to lines 80E, or at location F to lines 80F. Thus, in the patch panel in FIG. 2, a total of eighteen ISDN-BRI lines exit the patch panel 76. The patch panel 76 also has eighteen jacks: A1, A2, A3, B1, B2, B3, C1, C2, C3, D1, D2, D3, E1, E2, E3, F1, F2, and F3. Each of the eighteen jacks is connected to one of the eighteen individual ISDN-BRI lines exiting patch panel 76. For example, jack A1 82 is directly electrically connected to line 34a, jack A2 84 is directly electrically connected to line 34b, and jack A3 86 is directly electrically connected to line 34a.

In the prior art system shown in FIG. 2, location A is the active location and lines 34a–34c are in circuit communication with the three ISDN-BRI lines 48a–48c, respectively. The fifteen lines 80B–80F to locations B–F are left open, i.e., not in circuit communication. To make another location the active location, e.g., location C, one must remove ISDN-BRI patch cables 78a–78c from jacks A1 82, A2 84, and A3 86 in the patch panel and reinsert them into jacks C1 88, C2 90, and C3 92.

Figure 3:
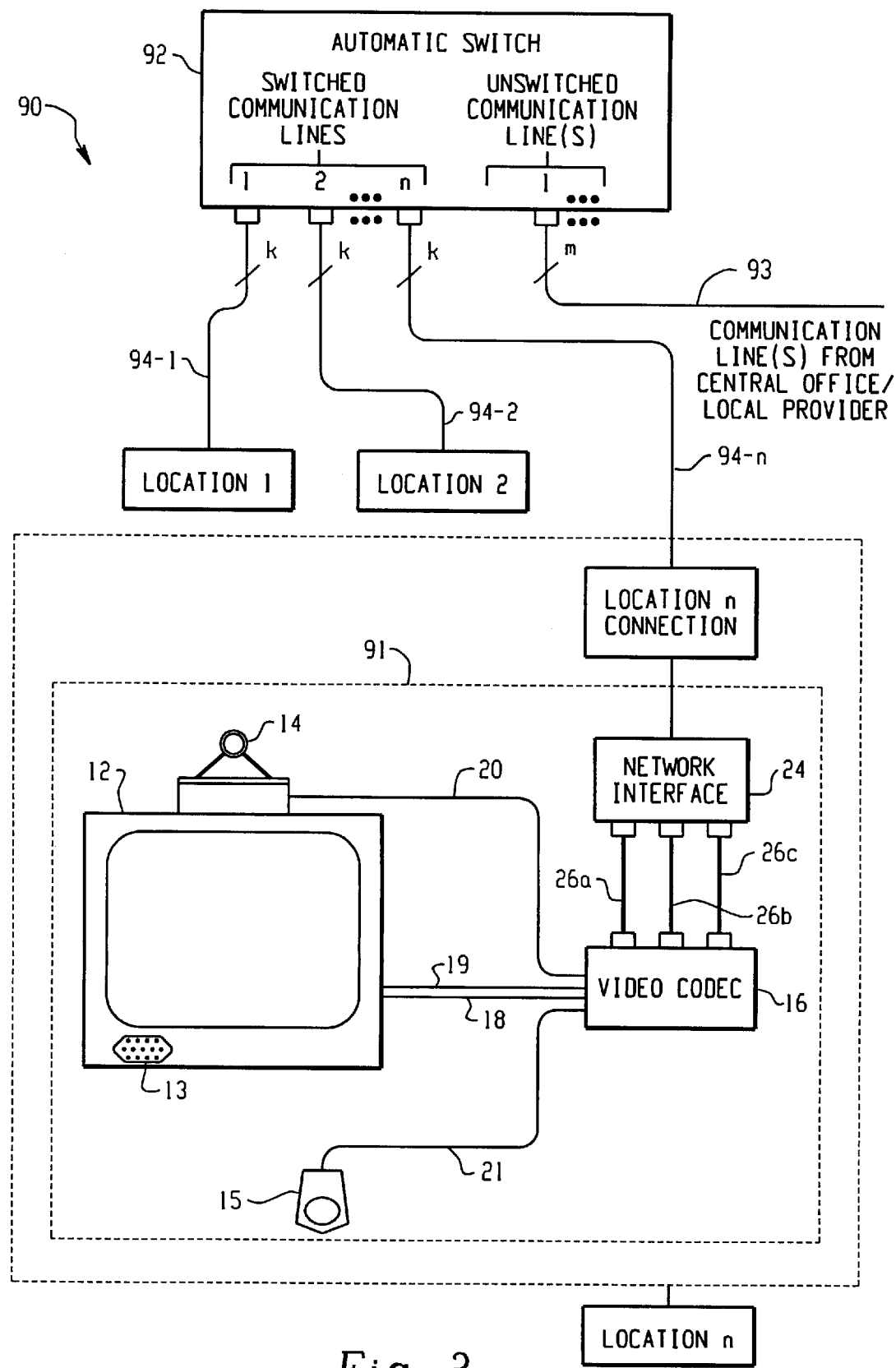
FIG. 3 is a schematic block diagram of a multiple location system implementing the communications switch of the present invention.

Referring now to FIG. 3, a multiple location system 90 according to the present invention is shown. The system 90 is in circuit communication with a device 91 requiring access to at least one communications line. More specifically, in the videoconferencing context, the system 90 includes the same videoconferencing equipment 91 (monitor 12, speaker 13, camera 14, microphone 15, video codec 16, network interface 24, and associated connections 18–21, and 26a–26c) as FIG. 1, except the videoconferencing equipment 91 is mobile, like in the system in FIG. 2. The system 90 in FIG. 3 includes an automatic communications switch 92 according to the present invention. The automatic switch 92 is in circuit communication with at least one unswitched communication line 93, which is/are switched by the automatic switch 92 to a plurality of switched communication lines 94-1, 94-2, . . . 94-n, with each of the switched communication lines 94-1, 94-2, . . . 94-n being in circuit communication with one of a plurality of different locations 1-n. The videoconferencing equipment 91 is in circuit communication with one of the locations 1-n, specifically location n in FIG. 3. The automatic switch 92 includes a control unit and a switch bank (neither shown in FIG. 3). As further explained herein, the control unit determines to which particular location of the plurality locations 1-n the at least one communication line 93 is to be connected and the switch bank switches at least one of the at least one communication line 93 to that location. In the broadest sense, the control unit can determine one of a plurality of locations requiring access to a communications line and the switch bank can switch an appropriate number of communication lines to each such location.

Figure 4:
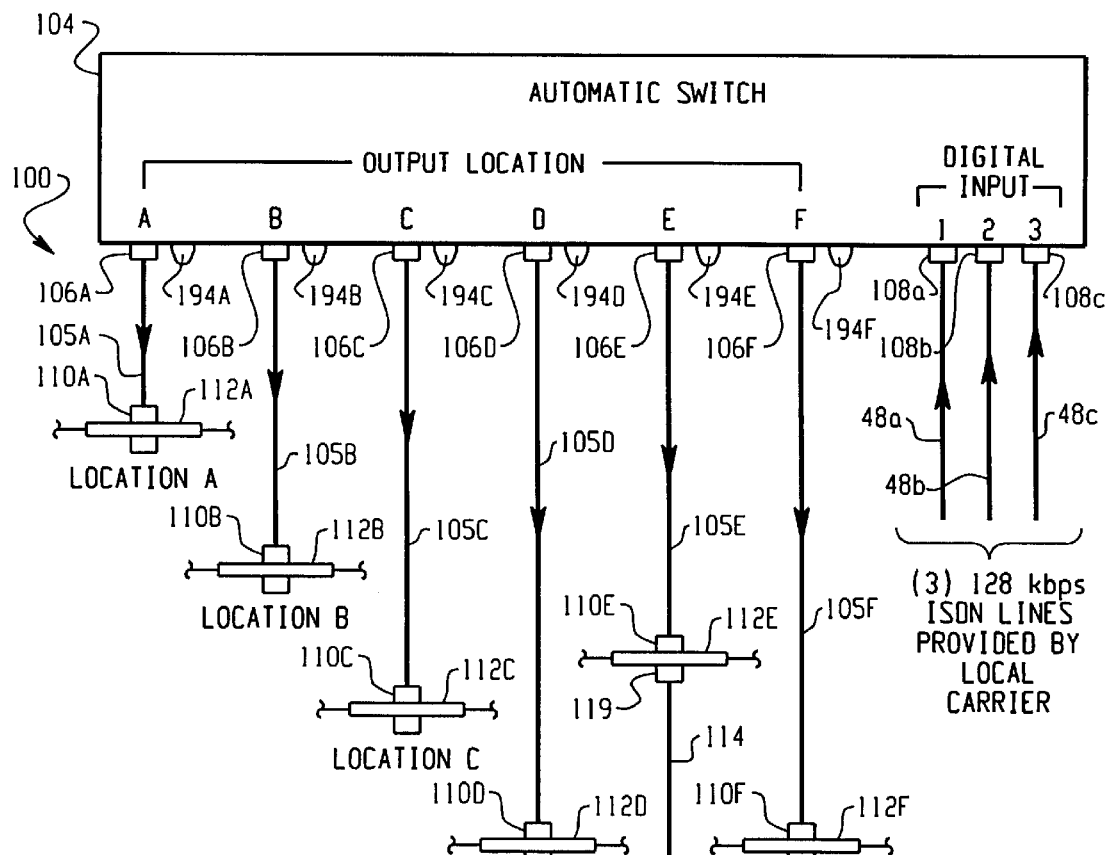
FIG. 4 is a schematic block diagram of an embodiment of the multiple location system of FIG. 3 showing an ISDN switch and novel cabling of the present invention for use with a 384 kbps videoconferencing application (i.e., for 128 kbps, 256 kbps, or 384 kbps videoconferencing)
Figure 4:
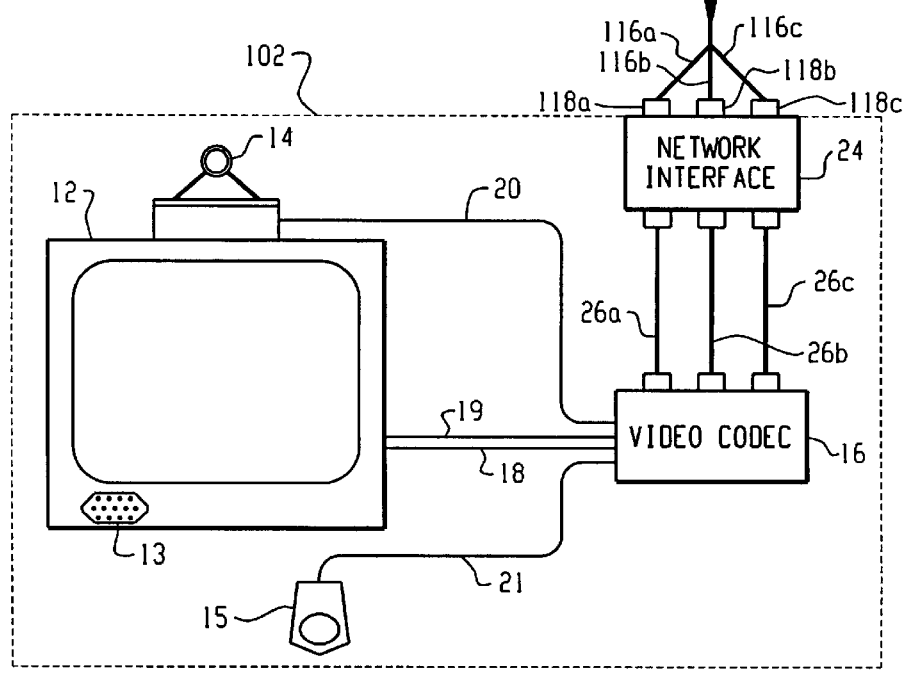

Referring now to FIG. 4, a multiple location system 100 according to the present invention is shown. The system 100 is a 384 kbps videoconferencing system and includes the same videoconferencing equipment 102 (monitor 12, speaker 13, camera 14, microphone 15, video codec 16, network interface 24, and associated connections 18–21, and 26a–26c) as FIG. 1, except the videoconferencing equipment 102 is mobile, like in the system in FIGS. 2 and 3. The system 100 in FIG. 4 includes an automatic ISDN switch 104 according to the present invention. The automatic ISDN switch 104 is in circuit communication with at least one communication line, which is/are switched by the automatic ISDN switch 104, with switched communication lines being in circuit communication with a plurality of different locations (with or without the use of hybrid lines).

In the system of FIG. 4, the communication lines are ISDN U interfaces from the central office or local carrier, specifically three such ISDN U interfaces 48a–4c. These lines will be referred to herein as "inputs" or "input lines." The plurality of different locations are represented by locations A–F in FIG. 4. In FIG. 4, the switched communication lines are switched ISDN U interfaces 105A–105F, which are connected to the automatic ISDN switch 104 via signal outputs 106A–106F.

The terms "input" and "output" and "input line" and "output line" and "output location" are used very loosely herein with respect to ISDN lines. ISDN U interfaces by their very nature are bidirectional; therefore, strictly speaking, ISDN U interfaces are both input lines and output lines. However, to offer a distinction between (i) the unswitched ISDN U interfaces 48a–48c from the central office or local carrier (not shown) and (ii) switched ISDN U interfaces 105A–105F, the following will be used: (a) the unswitched ISDN U interfaces 48a–48c will be referred to as "inputs" and "input lines," which are connected to switch 104 via "signal inputs" 108a–108c, and (b) switched ISDN U interfaces 105A–105F will be referred to as "outputs" and "output lines," which are connected to switch 104 via "signal outputs" 106A–106F.

Each switched communication line is in circuit communication with a single location of the plurality locations via any suitable circuit communication means, including by way of example but not of limitation, one or more conductor(s), connector(s), computer network(s), fiber optic link(s), optical signal(s), radio signal(s), electromagnetic signal(s), telephone line(s), sonic link(s), ISDN lines, hybrid ISDN lines, existing Ethernet cable(s), power line(s) (using, e.g., an X-10 interface), etc. In FIG. 4, the switched communication lines 105A–105F are preferably eight-conductor CAT-5 or CAT-6 cables acting as hybrid ISDN lines. More specifically, in the embodiment of FIG. 4, each switched communication line 105 has three ISDN-BRI lines (six 64 kbps lines) on three of the four twisted pairs therein, leaving one more twisted pair in the cable for either autodetection by or communication with the control unit (not shown) in the switch 104.

The switched communication lines 105A–105F are routed from the switch 104 to the locations A–F and connect to those locations at RJ-45 wall-jack connectors 110A–110F passing through wall plates 112A–112F in walls 114A–114F. One connects the network interface 24 of the videoconferencing equipment 102 to one of the switched ISDN lines 105A–105F via a custom breakout cable 113. The custom breakout cable 113 divides a hybrid ISDN line portion 114 into three ISDN-BRI lines 116a–116c and has a single RJ-45 connector 119 at one end and three RJ-45 connectors 118a–118c at the other end.

Figure 5:
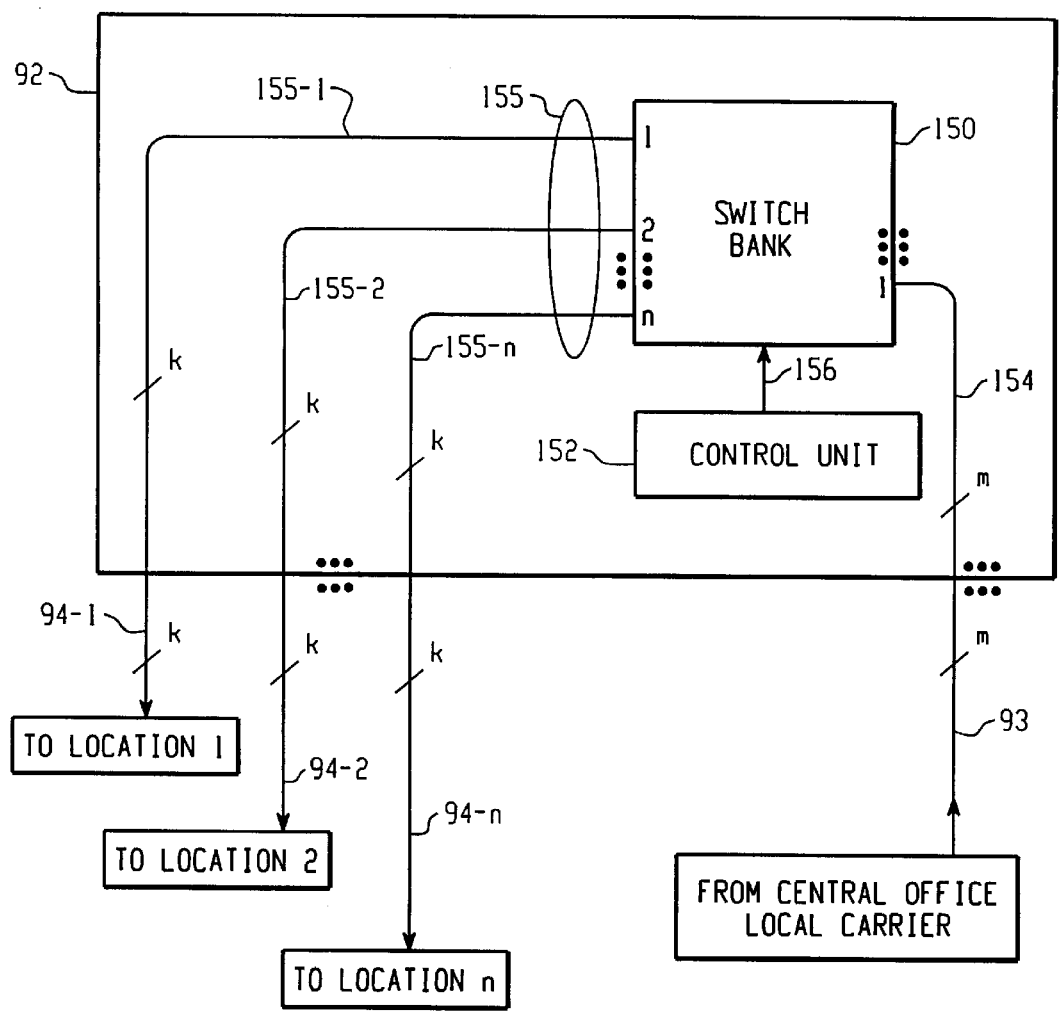
FIG. 5 is a schematic block diagram of a generic automatic switch of the present invention.

FIG. 5 shows a generic automatic switch 92 according to the present invention. The switch 92 is in circuit communication with the at least one unswitched communication line 93 from the central office or local carrier and the plurality of locations via a plurality of switched communication lines 94-1, 94-2, . . . 94-n. The unswitched communication line 93 is passed into the switch 92 as unswitched communication line 154. The plurality of switched communication lines 94-1, 94-2, . . . 94-n are passed from the switch 92 as a plurality of switched communication lines 155-1, 155-2, . . . 155-n. The switch 92 comprises a switch bank 150 in circuit communication with a control unit 152 via a location signal 156. The switch bank 150 is also in circuit communication with the at least one unswitched communication line 154 and the plurality of switched communication lines 155-1, 155-2, . . . 155-n. The control unit 152 generates a location signal 156 (i.e., alters the characteristics of the signal(s), if any, of the location signal 156 present prior to the generation by the control unit) corresponding to a particular one location of the plurality of locations. In response, the switch bank 150 automatically switches the at least one unswitched communication line 154 to a particular one of the plurality of switched communication lines 155-1, 155-2, . . . 155-n corresponding to the particular one of the plurality of locations indicated by the location signal 156.

In general, the control unit 152 performs at least two basic functions: determining (or allowing a user to communicate) which particular location requires the use of the at least one communication line and communicating that particular location to the switch bank 150. In the alternative, the control unit 152 can perform additional functions, such as (i) determining (or allowing a user to communicate) whether permission has been granted for the at least one communication line to be used at that particular location at that particular time and/or (ii) determining (or allowing a user to communicate) which of a plurality of unswitched communication lines should be allocated to one or more locations and/or (iii) implementing a communication link (and/or providing status information).

Figure 6:
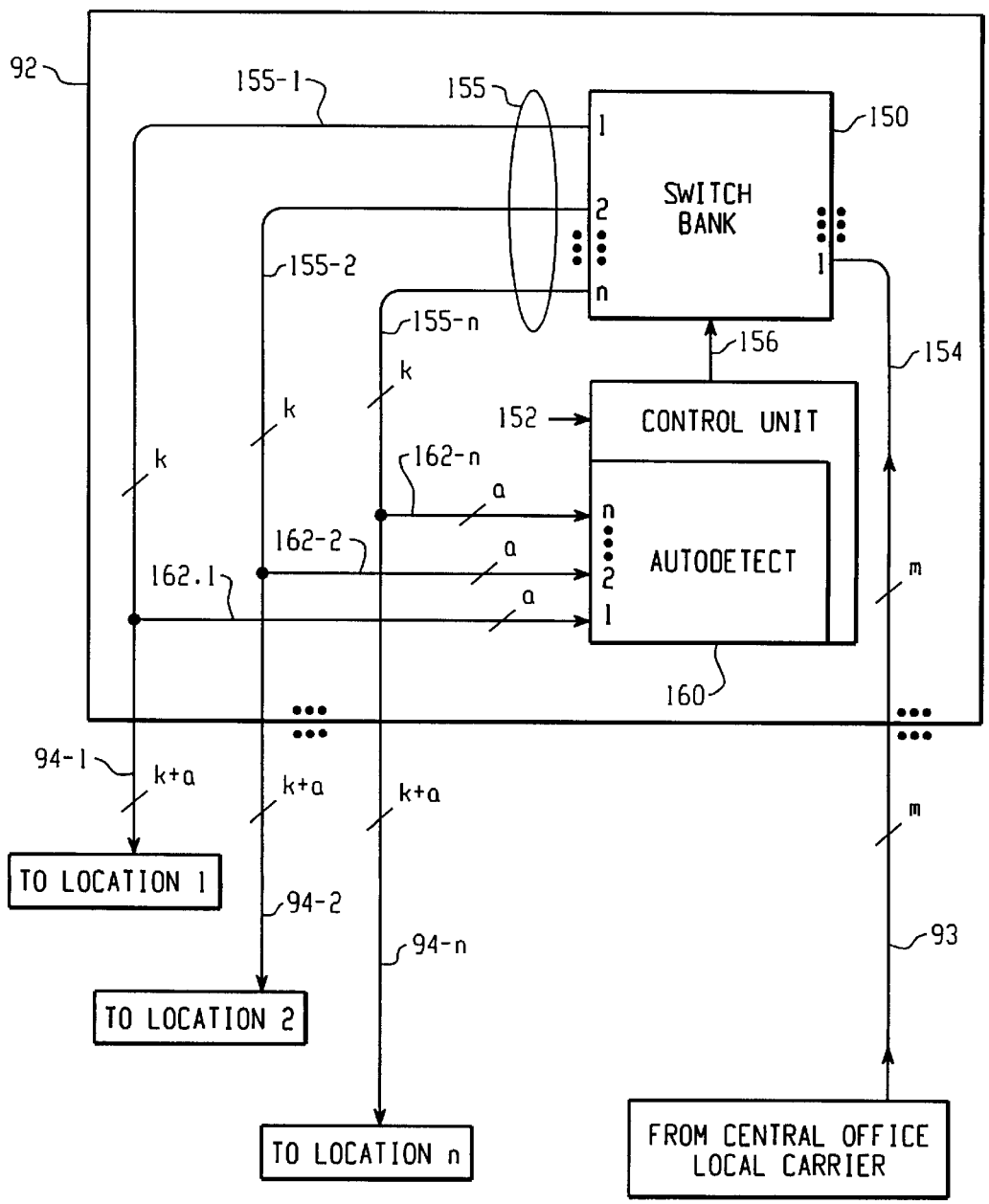
FIG. 6 is a schematic block diagram of an automatic switch according to the present invention with autodetection of the desired location using a communications link routed along with switched communications lines.

FIG. 6 shows an embodiment of switch 92 having a control unit 152 that comprises autodetect logic 160, which determines to which of locations 1-n the at least one unswitched communication line 154 should be switched based on one or more activities being performed in the particular location. Autodetect logic 160 is in circuit communication with each of the plurality of locations 1-n. Autodetect logic 160 can be implemented in hardware, in executable code, in a combination of hardware and executable code, and by other means. In FIG. 6 autodetect logic 160 is in circuit communication with each of the plurality of locations 1-n via lines 162-1, 162-2, . . . 162-n, which pass to the locations 1-n with switched communication lines 155-1, 155-2, . . . 155-n via lines 94-1, 94-2, . . . 94-n. Each of lines 162-1, 162-2, . . . 162-n comprise at least one communication path with which autodetect logic 160 determines to which of locations 1-n the at least one unswitched communication line 154 should be switched. When the at least one communication path of lines 162-1, 162-2, . . . 162-n comprise at least one conductor, autodetect logic 160 can make this determination by, by way of example but not of limitation: detecting a change in the electrical state of the at least one conductor connecting to the particular location, detecting that first and second conductors connecting to the particular location have been shorted together, detecting a change in the electrical relationship between first and second conductors connecting to the particular location, detecting a change in the impedance between first and second conductors connecting to the particular location.

For the autodetect logic in the embodiment of FIG. 6, it matters not what causes the change in the communication path 162. The change in the communication path (e.g., change in the electrical state of the at least one conductor, first and second conductors connecting to the particular location being shorted together, change in the electrical relationship between first and second conductors, change in the impedance between first and second conductors, etc.) can be caused by numerous ways, all of which are contemplated to be within the scope of the present invention. These changes can be caused by, by way of example but not of limitation: (a) electrical conductors within a connector plugged into a receptacle in circuit communication with the autodetect logic 160, (b) a push-button located at the particular location (e.g., located on the wall plate used to connect to the switched communication line(s), located on the wall above the wall plate used to connect to the switched communication line(s), located on a cable used to connect to the switched communication line(s), located on the videoconferencing equipment, etc.) and causing the change in the communication path in response to the switch being pressed or actuated, (c) a circuit including a keypad, capable of making a determination on its own whether any keys pressed are valid and causing the change in the communication path in response to a proper sequence of keys being actuated, and located at the particular location (e.g., located in any of the locations listed above), (d) a circuit including a key card reader, capable of making a determination on its own whether a key card is valid and causing the change in response thereto, and located at the particular location (e.g., located in any of the locations listed above), (e) a circuit including a sensor (e.g., voice sensor, retinal scanner, thumb print scanner, hand print scanner, another scanner, etc.), capable of making a validation determination on its own and causing the change in response thereto, and located at the particular location (e.g., located in any of the locations listed above).

As shown in FIG. 6 and as discussed above, the communication path 162 is separate from the switched communication lines 155. In the alternative, the switched communication lines 155 can be used for both autodetection and communication, without the need for separate additional lines being run from the switch 92 to the locations. This can be important for applications requiring all eight conductors in a CAT-5 cable, such as 512 kbps medical videoconferencing applications; there are no spare conductors left over to form a communication link to the autodetect logic 160. In this alternative embodiment, the switched communication lines 155 would be used first as a communication path 162 to communicate with the autodetect logic 160 and then as switched communication lines 155, since the switched communication lines would not need to carry information from the unswitched communication lines 154 until after a determination of the particular location has been made. The remainder of this alternative embodiment would be the same as the FIG. 6 embodiment.

FIG. 6 and the accompanying text describe embodiments of the present invention somewhat generally. FIGS. 7–10 show schematically a embodiment of a switch 104 specifically for a 384 kbps ISDN videoconferencing system with autodetection of the particular location based on inserting the ISDN connector from the videoconferencing equipment into the ISDN receptacle at that location.

Figure 7:
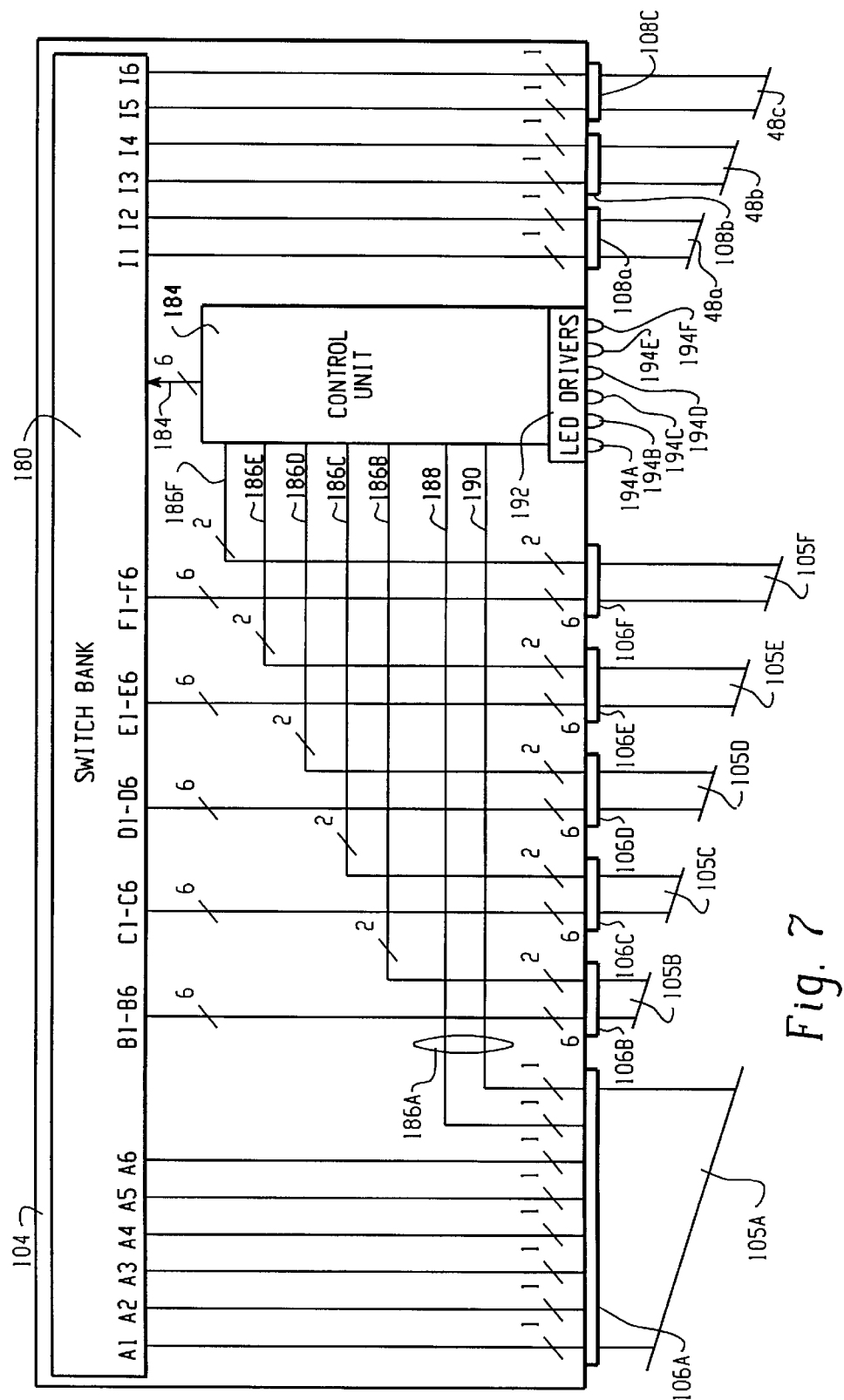
FIG. 7 is a schematic block diagram of the ISDN switch of FIG. 4.

FIG. 7 is a schematic block diagram of the switch 104 specifically for a 384 kbps videoconferencing application. The switch 104 of FIG. 7 is for use in the system of FIG. 4 and described in the accompanying text, and has three unswitched ISDN-BRI U interfaces 48a–48c switched to six possible locations A–F via switched ISDN U interfaces 105A–105F. Switch 104 comprises a switch bank 180 in circuit communication with a control unit 182 via a six-line location signal 184. Internally, lines I1 and I2 correspond to the two 64 kbps lines in (pins 4 and 5 of) ISDN-BRI line 48a, lines I3 and I4 correspond to the two 64 kbps lines in (pins 4 and 5 of) ISDN-BRI line 48b, and lines I5 and I6 correspond to the two 64 kbps lines in (pins 4 and 5 of) ISDN-BRI line 48c. These six lines I1–I6 are switched by switch bank 180 to lines A1–A6, B1–B6, C1–C6, D1–D6, E1–E6, or F1–F6, respectively, depending on which of the six lines in the location signal 184 is active. The lines 105A, 105B, 105C, 105D, 105E, and 105F preferably comprise eight-wire (four twisted pair) CAT-5 or CAT-6 cables. Since each line 105 includes more than two 64 kbps ISDN U interfaces, i.e., includes six 64 kbps ISDN U interfaces (A1–A6, B1–B6, C1–C6, D1–D6, E1–E6, or F1–F6), lines 105A, 105B, 105C, 105D, 105E, and 105F are referred to as "hybrid ISDN lines." In a 384 kbps application, in addition to carrying the six switched ISDN lines A1–A6, B1–B6, C1–C6, D1–D6, E1–E6, or F1–F6, each line (i.e., each CAT-5 or CAT-6 cable) connecting the switch 104 to a location A–F also has an extra pair of conductors 186A, 186B, 186C, 186D, 186E, or 186F in circuit communication with the autodetect logic (not shown) of control unit 182. Two conductors 188, 190 of pair of conductors 186A for Location A are shown.

The control unit 182 is also in circuit communication with a bank (of LED drivers 192, which drive LEDs 194A, 194B, 194C, 194D, 194E, and 194F, corresponding to locations A–F. respectively. These LEDs 194 indicate which one of the six locations, if any, currently has access to the unswitched lines I1–I6. The LEDs 194 are preferably positioned near the line, or an indication of the line, to which each corresponds.

Figure 8A:
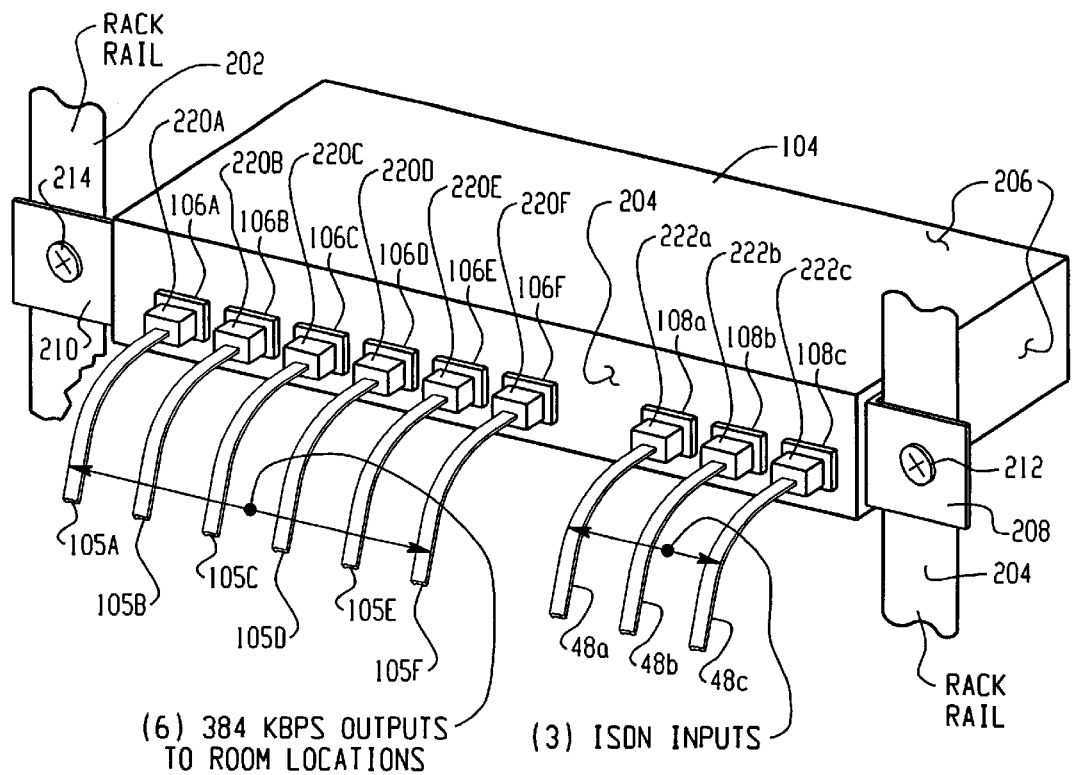
FIG. 8a is an isometric view of the ISDN switch of FIGS. 4 and 7 mounted in a 19" rack.
Figure 8B:
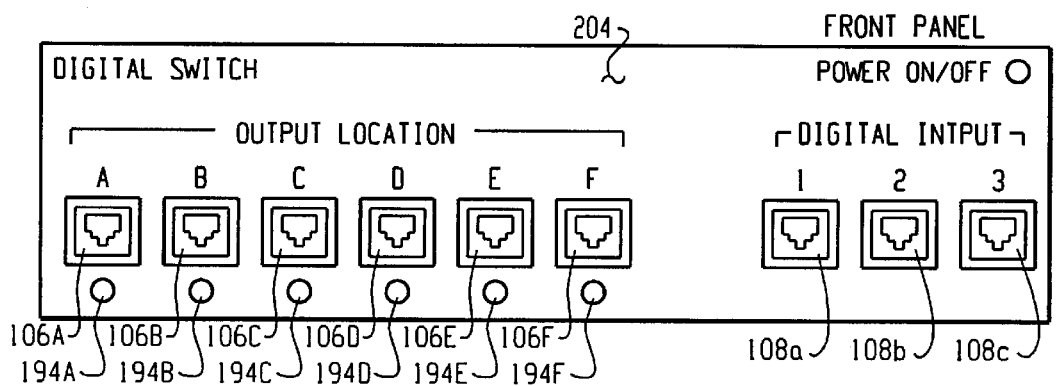

Referring now to FIG. 8a and FIG. 8b, an isometric view of the switch 104 mounted in a 19" rack having rails 200, 202 and a view of the front panel 204 of switch 104 are shown. The switch 104 has an enclosure 206 having brackets 208, 210 physically annexed thereto. Brackets 208, 210 are secured to rack rails 204, 202, respectively, by suitable fasteners, e.g., screws 212, 214. Signal inputs 108a–108c and signal outputs 106A–106F comprise RJ-45 receptacles in this particular switch 104. LEDs 194A–194F are shown in proximity to signal outputs 106A–106F. Switched ISDN lines A1–A6, B1–B6, C1–C6, D1–D6, E1–E6, and F1–F6, and autodetect lines 186A–186F (FIG. 7), are electrically connected to signal outputs (RJ-45 receptacles) 106A–106F, which have RJ-45 connectors 220A–220F inserted therein to directly electrically connect therewith, which connectors are electrically connected to lines 105A–105F. Similarly, unswitched ISDN lines 48a–48c are connected to RJ-45 connectors 222a–222c, which are inserted to signal inputs (RJ-45 receptacles) 108a–108c to place the unswitched ISDN lines I1–I6 into circuit communication with the six 64 kbps lines in ISDN U interfaces 48a–48c, respectively.

Figure 8C:
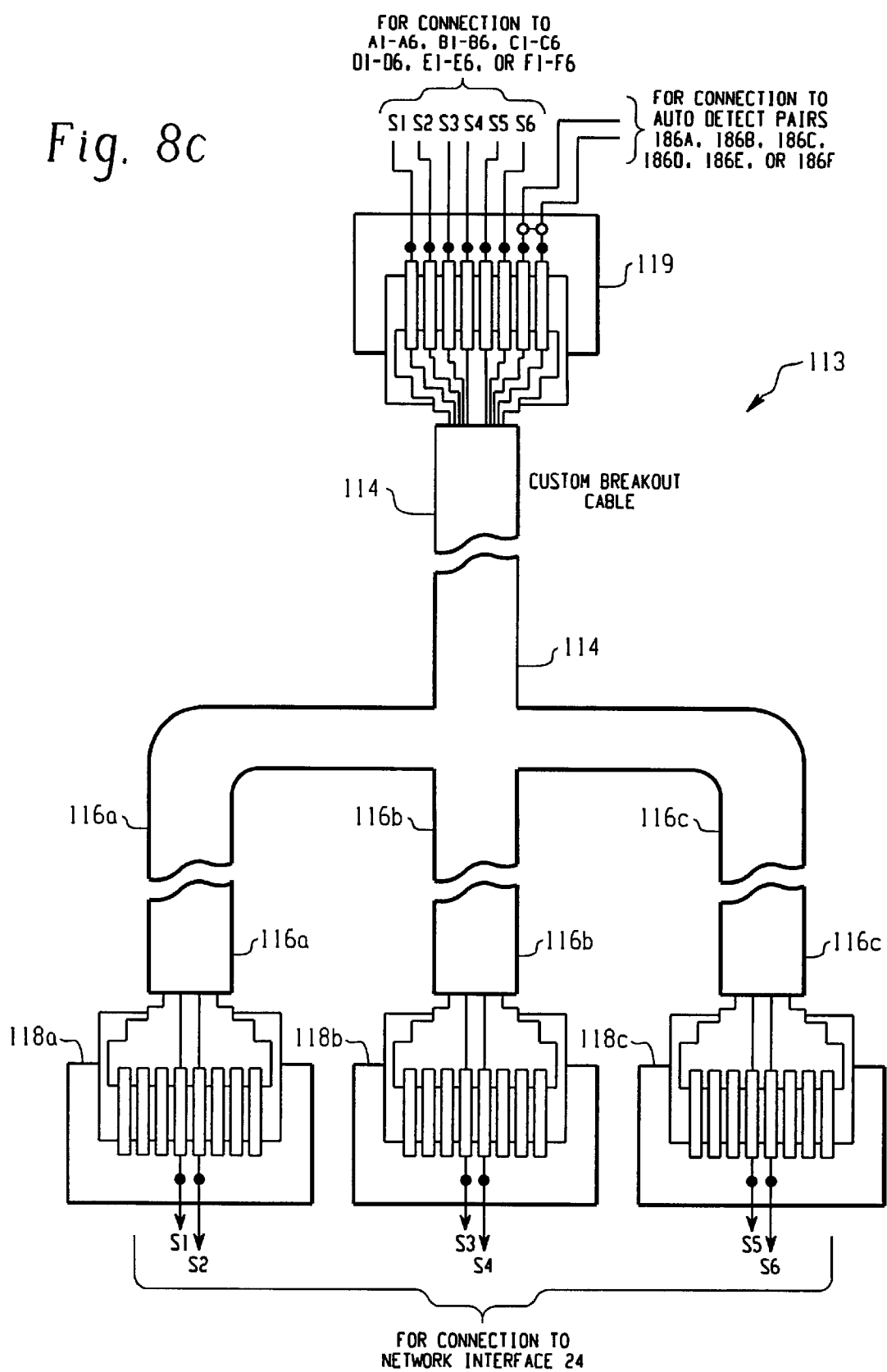
FIG. 8c is a schematic block diagram of a breakout cable for the ISDN switch of FIGS. 4, 7, 8a and 8b.

Referring now to FIG. 8c, the custom breakout cable 113 is shown schematically. As discussed above in connection with FIG. 4, because the embodiment of FIG. 4 uses hybrid ISDN lines, one cannot use standard cables to connect the videoconferencing equipment 102 at any of the locations. Rather, one connects the network interface 24 of the videoconferencing equipment 102 to one of the switched ISDN lines 105A–105F via a custom breakout cable 113. The custom breakout cable 113 divides a hybrid ISDN line portion 114 into three ISDN-BRI lines 116a–116c and has three RJ-45 connectors 118a–118c at one end and has a single RJ-45 connector 119 at the other end. Pins 7 and 8 in connector 119 are shorted together to short autodetect lines 188 and 190 when the connector 119 is inserted into receptacle 110 in wall plate 112 at any of the locations A–F. In the alternative, these two pins can be connected via a relatively low resistance connection. As shown in FIG. 8c, lines S1 and S2 of connector 119 are broken out to lines S1 and S2 of connector 118a (pin 1 of connector 119 is routed to pin 4 of connector 118a and pin 2 of connector 119 is routed to pin 5 of connector 118a), lines S3 and S4 of connector 119 are broken out to lines S3 and S4 of connector 118b (pin 3 of connector 119 is routed to pin 4 of connector 118a and pin 4 of connector 119 is routed to pin 5 of connector 118a), and lines S5 and S6 of connector 119 are broken out to lines S5 and S6 of connector 118c (pin 5 of connector 119 is routed to pin 4 of connector 118a and pin 6 of connector 119 is routed to pin 5 of connector 118a).

Figure 9:
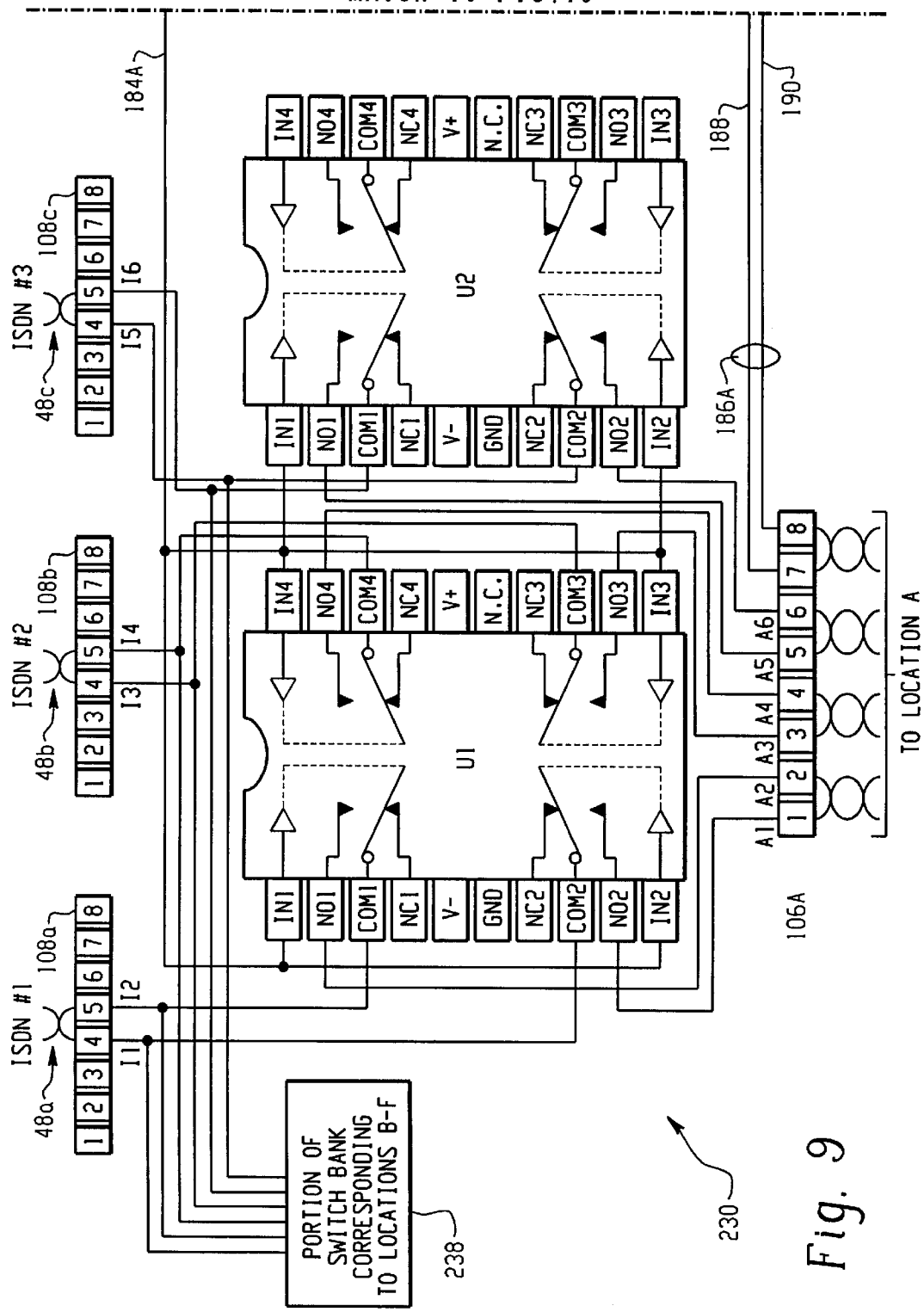
FIG. 9 is a schematic block diagram of a portion of the switch bank of the ISDN switch of FIGS. 4, 7, 8a, 8b, and 8c.
Figure 10:
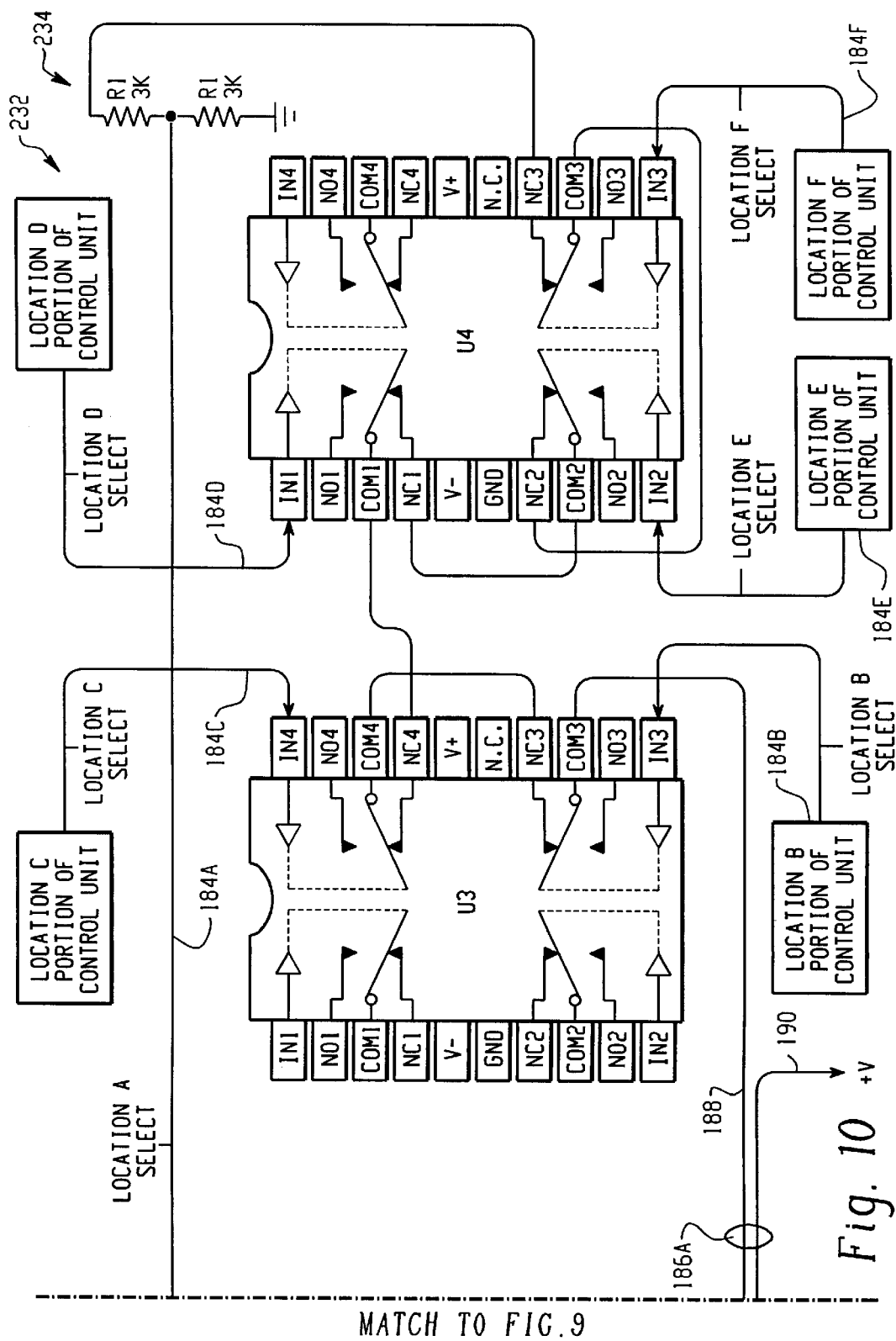
FIG. 10 is a schematic block diagram of a portion of the control unit of the ISDN switch of FIGS. 4, 7, 8a, 8b, 8c, and 9.

FIGS. 9 and 10 show schematically portions of the switch bank 180 and control unit 182 of the switch 104 in FIGS. 4, 7, and 8. More specifically, FIG. 9 shows the portion 230 of switch bank 180 that corresponds to location A and FIG. 10 shows the portion 232 of control unit 182 that corresponds to location A. In switch bank 180 and control unit 182, the circuitry 230 and 232 would be replicated for locations B–F with appropriate interconnections for each location. In this particular implementation, switch bank 180 is implemented with quad CMOS analog switches, and switch control unit 182 is implemented with quad CMOS analog switches and a few passive components. Thus, the circuit portions 230, 232 are implemented using quad CMOS analog switches and a few passive components. Switch bank portion 230 uses four CMOS analog switches in quad CMOS analog switch U1 and two CMOS analog switches in quad CMOS analog switch U2. Control unit portion 232 uses two CMOS analog switches in quad CMOS analog switch U3, three CMOS analog switches in quad CMOS analog switch U4, and two resistors, R1 and R2. Virtually any CMOS analog switches could be used for this implementation; none of the parameters are particularly important. Quad CMOS analog switches were used because of their relative density and ready availability. The switching time of the particular analog switch used is not critical because the switch 104 is used in a very low frequency environment. The on-resistance of the particular switches is also not particularly critical. Switches with a maximum on-resistance of 35 ohms are suitable. Signal inputs 108a–108c, which are in circuit communication with ISDN-BRI U-interface lines 48a–48c, and signal outputs 106A–106F (106B–106F not shown), which are in circuit communication with hybrid ISDN lines 105A–I05F (105B–105F not shown), comprise RJ-45 receptacles in this particular switch 104. The switch 104 also requires a power supply (not shown) to provide the voltages needed for the particular switch bank and control unit used. The power supply for the embodiment of FIGS. 9 and 10 supplies +8 VDC and −8 VDC, in addition to ground.

The components for switch bank portion 230 and control unit portion 232 are placed in circuit communication as shown in FIGS. 9 and 10. As shown in those figures, each of the six unswitched 64 kbps ISDN lines I1–I6 from the central office is in circuit communication with a common pole of one of the SPDT switches in the quad CMOS analog switches U1, U2. Each of the corresponding six switched 64 kbps ISDN lines A1–A6 are in circuit communication with a corresponding normally open pole of one of the SPDT switches in the quad CMOS analog switches U1, U2. The allocation of the switches is not a critical aspect of the present invention. As should be apparent to those in the art, the individual analog switches need not be allocated as shown in FIGS. 9 and 10; as examples, the two switches from U3 could have come from the remaining switches in U2 and in the alternative, all the switches can come from any combination or permutation of quad CMOS analog switches. Also, unswitched lines I1–I6 and switched lines B1–B6, C1–C6, D1–D6, E1–E6, and F1–F6 (all not shown in FIG. 9) are connected to portion 238 of switch bank 180 corresponding to locations B–F. Although not shown in FIGS. 9 and 10, all six select lines 184A–184F are also in circuit communication with portion 238 of switch bank 180 corresponding to locations B–F.

As shown in FIGS. 9 and 10, the portion 232 of control unit 182 corresponding to Location A is in circuit communication with autodetect lines 188 and 189 for Location A (collectively 186A), which correspond to pins 7 and 8 of receptacle 106A. Autodetect line 190 is connected to +V (8 VDC) and autodetect line 188 is in circuit communication with a voltage divider 234 via a plurality of normally closed analog switches. The voltage divider 234 comprises resistor R1 (3 kΩ) and resistor R2 (3 kΩ) between line 188 and ground, as shown in FIG. 10. When lines 188 and 190 are open, as when no audiovisual equipment is being used, location A select 184A is pulled to a logical low by resistor R2. When lines 188 and 190 are closed, as when audiovisual equipment is being used, location A select 184A is pulled to a logical high by resistor divider 234. In this particular implementation of the switch 104 of the present invention, the +V (V+) and −V (V−) lines for switches U1–U4 are at 8 VDC and −8 VDC, respectively. In general, autodetect line 188 is in circuit communication with a voltage divider 234 via a number of normally closed analog switches equal to the number of locations being autodetected, minus one. In the particular example of FIGS. 9 and 10, there are six locations A–F. Thus, autodetect line 188 passes through five normally closed switches as shown in FIG. 10.

One location locks out the other locations as follows. On the one hand, if no other location is currently being detected, then all five of the location select lines 184B–184F are inactive, all five of the normally closed switches in U3 and U4 remain closed, and the autodetect line 188 is in circuit communication with voltage divider 234. In this state, if autodetect lines 188 and 190 are shorted, or are connected with a relatively low resistance connection, then Location A select line 184A is pulled up to about 4 VDC by voltage divider 234, which causes the six normally open switches in U1 and U2 to close, which connects lines I1–I6 to A1–A6, respectively, i.e., the input signals are switched to location A. The portions of switch bank 180 and control unit 182 corresponding to Locations B–F function in the same way.

On the other hand, if any of the other locations is currently being detected, then at least one of the five location select lines 184B–184F is active, at least one of the corresponding normally closed switches in U3 and U4 opens. and the autodetect line 188 is not in circuit communication with voltage divider 234. In this state, if autodetect lines 188 and 190 are shorted, or are connected with a relatively low resistance connection, then nothing happens to Location A select line 184A; it remains pulled down to about 0 VDC (ground) by resistor R2. Thus, selecting another location effectively locks out location A, i.e., prevents closure of autodetect lines 188 and 190 from affecting Location A select line 184A. The portions of switch bank 180 and control unit 182 corresponding to Locations B–F function in the same way. Thus, if any location is active, the control unit locks out the other locations.

Additionally, the location selection lines 184A–184F are in circuit communication with typical LED drivers (one driver for each LED 194A–194F, drivers not shown) used to drive (i.e., illuminate) the LED 194 corresponding to the active location.

Figure 11:
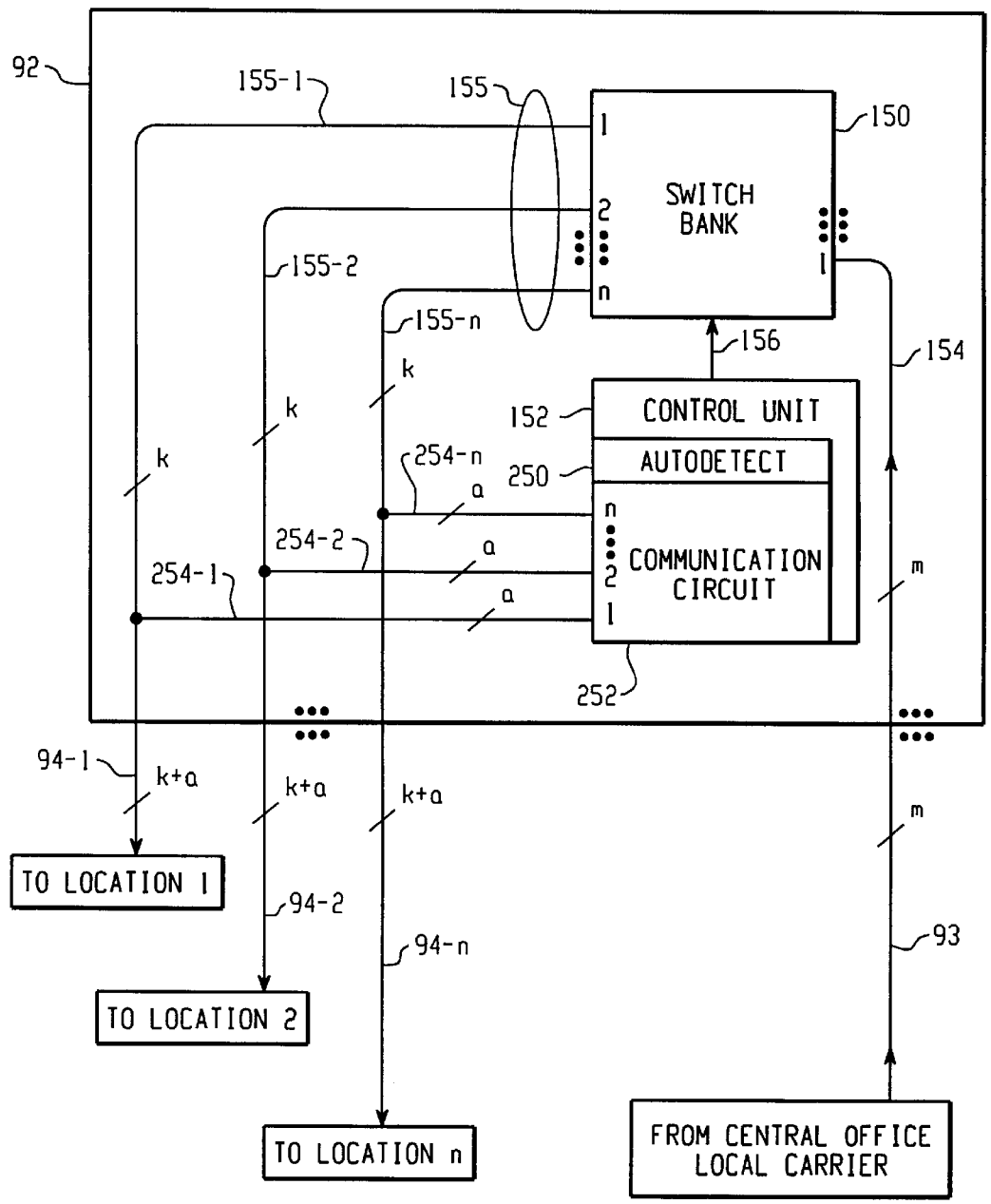
FIG. 11 is a schematic block diagram of an embodiment of an automatic switch according to the present invention with a communication circuit for communication with the various locations via communication links routed with switched communications lines and autodetection of the desired location using those communication links.
Figure 12:
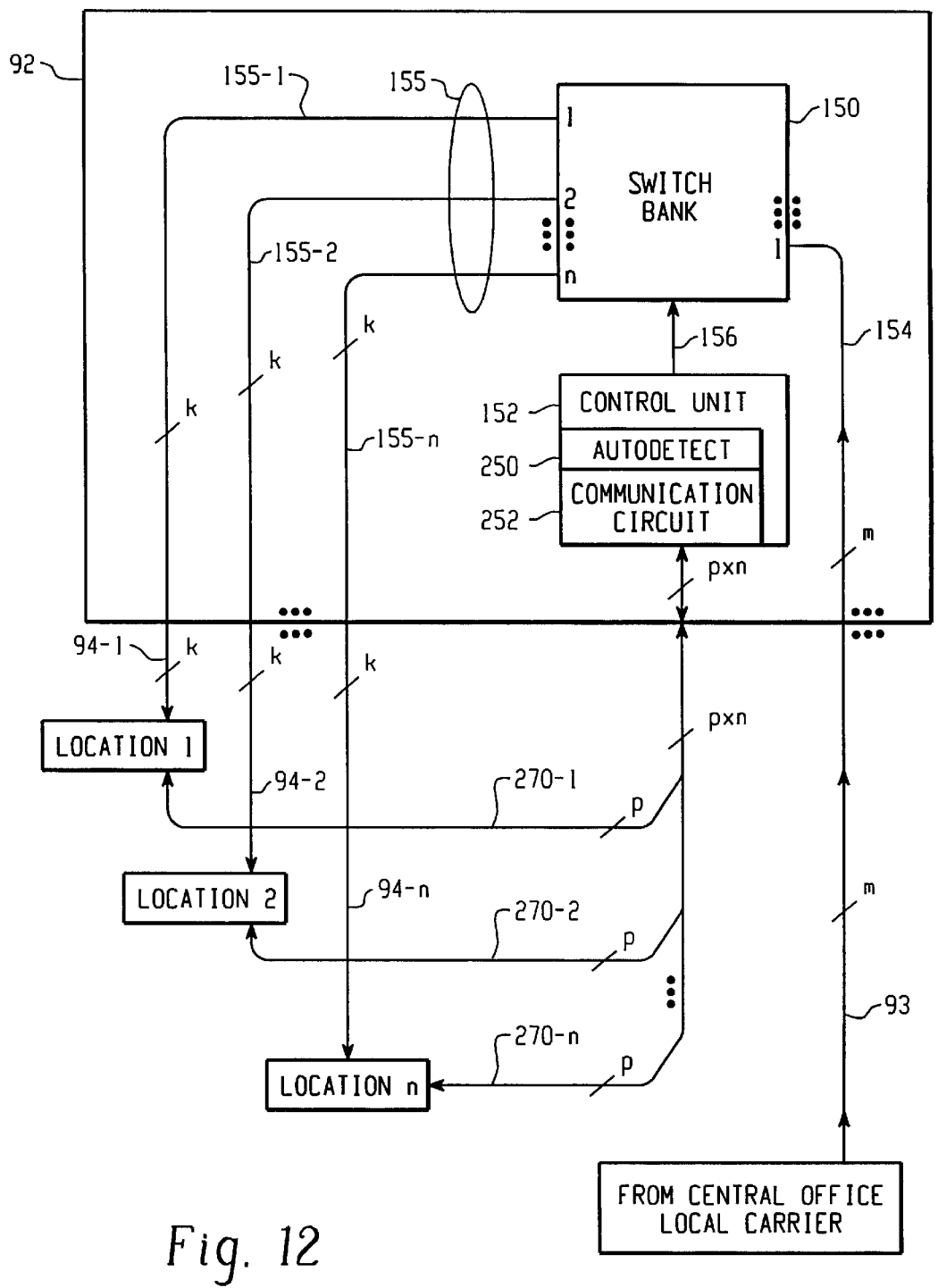
FIG. 12 is a schematic block diagram of an embodiment of an automatic switch according to the present invention with a communication circuit for communication with the various locations via communication links routed other than with switched communications lines and autodetection of the desired location using those communication links.
Figure 13:
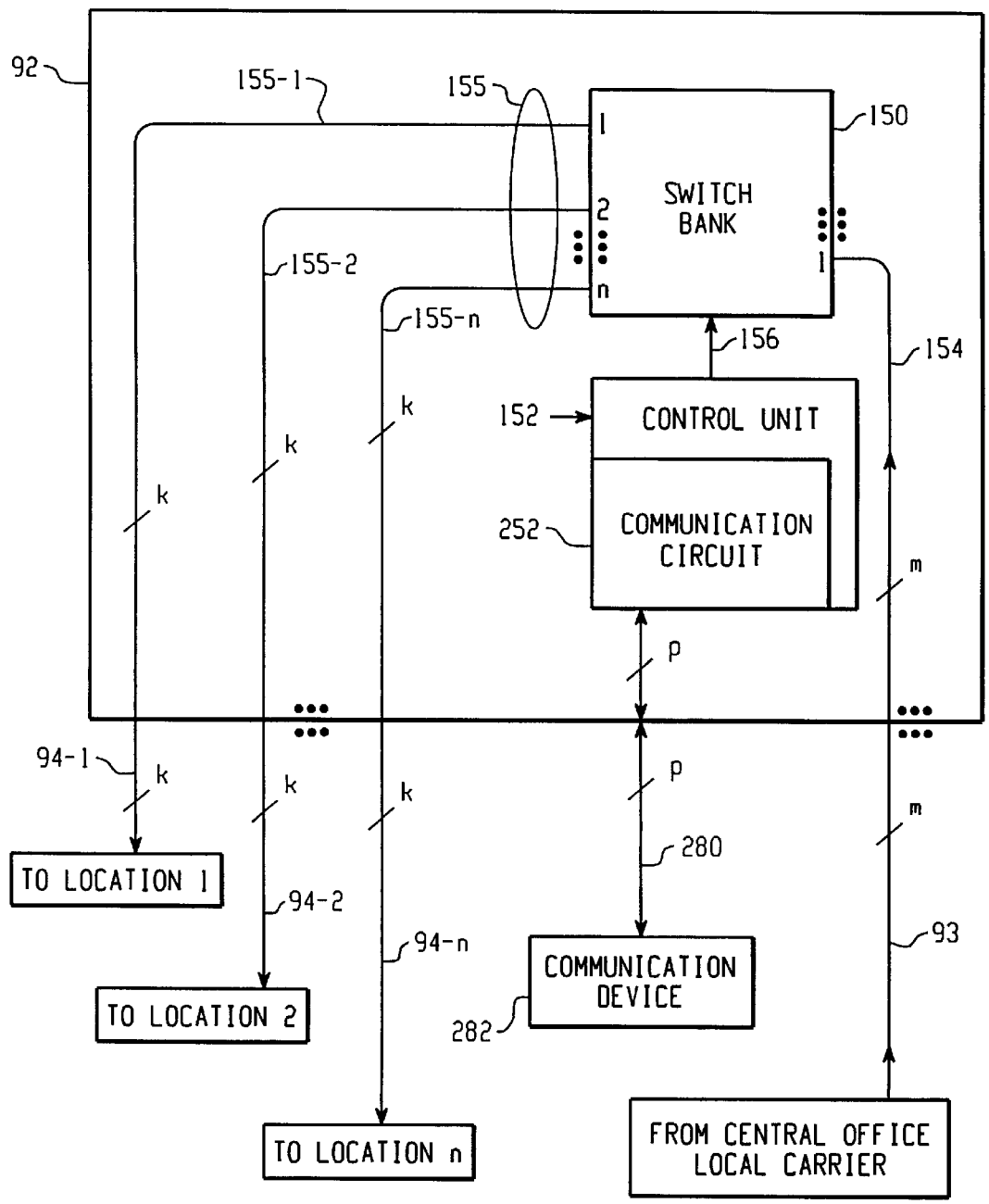
FIG. 13 is a schematic block diagram of an embodiment of an automatic switch according to the present invention with a communication circuit for communication with at least one communication device via at least one communication link.

FIGS. 11–13 show different embodiments of the control unit 152 shown in FIGS. 5 and 6. The embodiment of FIG. 11 is identical to the embodiment of FIG. 6, except the control unit 152 has both autodetect logic 250 and a communication circuit 252. In both the embodiment of FIG. 6 and the embodiment of FIG. 8, the communication link to each location is via a communication link routed with, and preferably in the same cable as, the switched communication lines 155-1, 155-2, . . . 155-n. In the embodiment of FIG. 6, the signals on communication link 162-1, 162-2, . . . 162-n are very simple, as discussed above. The embodiment of FIG. 11 contemplates more sophisticated communication over communication link 254-1, 254-2, . . . 254-n between the control unit 152 and the locations 1-n. Accordingly, the control unit 152 comprises a communications circuit 252 to provide a communication protocol with circuitry (not shown) at the locations 1-n. The circuitry at each location contemplated by this embodiment is the same as the circuitry at each location contemplated by the embodiment of FIG. 6 (e.g., circuit including a keypad, a circuit including a key card reader, and a circuit including a sensor), and located at the locations, except the circuits contemplated by this embodiment require more elaborate communication with the control unit 152.

The more sophisticated communication of FIG. 11 might be required because the particular circuitry at a location might not be capable of making a validation determination itself, but instead requires more processing power. For example, the communications circuit 252 might develop an RS-232 link or RS-422 link between the control unit 152 and a keypad or key card reader or pendant or other circuit at each location. Each time, for example, a key on the keypad is actuated, a value corresponding to the actuated key could be sent to the control unit via the communications link 254-1, 254-2, or 254-n and the control unit 152 itself would determine whether a series of keystrokes is valid. The location that transmitted the valid set of keystrokes, having been determined by the autodetect logic 250, would then be communicated to the switch bank 150 by the control unit 152 via the location signal 156. As with the embodiment of FIG. 6, the switched communication lines 155 in the embodiment of FIG. 11 can. in the alternative, be used for both autodetection and then communication, without the need for separate additional lines being run from the switch 92 to the locations. In this alternative embodiment, the switched communication lines 155 would be used first as a communication path 254 and then as switched communication lines 155.

The embodiment of FIG. 12 is identical to the embodiment of FIG. 11, except the sophisticated communication link 270 to each location is other than via a communication link routed with the switched communication lines 155-1, 155-2, . . . 155-n. The embodiment of FIG. 12 is an autodetect embodiment having a switch bank 150 and a control unit that are essentially the same as in FIG. 11, except the communication circuitry 252 of FIG. 12 can take more forms. The communications circuitry 252 in FIG. 12 can be circuitry to generate one or any combination of virtually any type of communications link: any protocol over one or more conductor(s), computer network(s), fiber optic link(s), optical signal(s), radio signal(s), electromagnetic signal(s), telephone line(s), sonic link(s), power line(s) (using, e.g., an X-10 interface). The embodiment of FIG. 12 contemplates sophisticated communication over communication link 270-1, 270-2, . . . 270-n between the control unit 152 and the locations 1-n, relative to the embodiment of FIG. 6. As with the other embodiments, this embodiment includes circuitry (not shown) at each location with which one requests use of the at least one unswitched communication line 154. The circuitry at each location contemplated by this embodiment includes at least the same circuitry at each location contemplated by the embodiment of FIG. 11 (e.g., circuit including a keypad, a circuit including a key card reader, and a circuit including a sensor). Additionally, the use of virtually any communications interface makes use of other circuitry possible. For example, with a proper interface, the communication circuitry could implement a telephone interface (e.g., by making the control unit 152 appear as all telephone extension or by interfacing directly with a firm's PBX) through which people might dial a particular telephone extension to request access to the unswitched communications lines. Then by using, for example, a caller-ID type function, or by direct access to the PBX, the autodetect logic 250 would determine the identity of the location requesting access, which location would be transmitted to the switch bank 150 via the location signal 156.

The embodiment of FIG. 13 is similar to the embodiment of FIG. 12, except the sophisticated communication link 280 is directed to at least one communications device 282 located at locations other than at the locations 1-n. The embodiment of FIG. 13 differs from the other embodiments in that it is not an autodetect embodiment; a user using the communications device 282 to directly selects or indicates which particular location to which the at least one unswitched communications line 154 is to be switched. The communications circuitry 252 in FIG. 13 can be circuitry to generate one or any combination of virtually any type of communications link: any protocol over one or more conductor(s), computer network(s), fiber optic linl(s), optical signal(s), radio signal(s), electromagnetic signal(s), telephone line(s), sonic link(s), power line(s) (using, e.g., an X-10 interface). The communications devices 282 contemplated by this embodiment includes at least the following: (a) a telephone (e.g., by making the control unit 152 appear as an telephone extension or by interfacing directly with a firm's PBX) through which people might dial a series of numbers to switch access to the at least one unswitched communications line 154, (b) a desktop computer (e.g., by implementing an RS-232 or other standard computer interface or by interfacing the control unit 152 to a computer network with the communications circuit 252) with which one would select a location, (c) a palm top computer (e.g., by implementing a wireless interface), (d) a web browser (e.g., by implementing a URL for the control circuit 152) with which one would select a location, (e) a keypad located, e.g., on the enclosure for the switch, or at the location where the switch is located, or located at some other location. The numerous communications links contemplated by the embodiments of FIG. 12 and FIG. 13 can be connected to the switch 92 by any suitable connector placed in circuit communication with the control unit by any circuit communication means. Using a computer interfaced to the control unit via the communication circuit, such selection of a location can be made with any number of commonly known computer interfaces, such as a command line interface (e.g., a "switchto destination" command, e.g., switch to cr13ne (conference room 13 Northeast)) or with a graphical user interface (e.g., having an icon for each unswitched communication line and an icon for each location and clicking on and dragging unswitched communication line(s) to location(s)). Using a telephone interfaced to the control unit via the communication circuit, such selection of a location can be made with any number of commonly used telephone interfaces, such as an audible menu-driven interface (e.g., "press 1 to select a location for the ISDN lines to be switched to," "press 2 to know the location currently accessing the ISDN lines," "press 3 to know the status of the automatic ISDN switch," etc.) or having particular number codes cause each action (e.g., pressing 1-1 causes the switch to route the lines to a first location, pressing 1-2 causes the switch to route the lines to a second location, pressing 9-9 causes the switch to route the lines to none of the locations, etc.). Such commands via telephone, computer, etc. can be expected to be carried out virtually immediately or, in the alternative, at some other date and/or time by addition of other parameter(s) to the command, which would allow scheduling of resources in advance (e.g., a "switchto destination on date at time" command).

Using the embodiment of FIG. 13 also allows added functionality to the control unit, such as allowing a user to allocate a plurality of unswitched communications lines to more than one location with an enhanced (not one-of-n) switch bank. This type of user-selected bandwidth on demand has obvious advantages, such as flexibility. For example, in a system having six ISDN-BRI U interface lines from the central office, using any of the communications devices listed herein (or others) one might command the control unit to cause the switch bank to allocate three ISDN-BRI lines to location A for a 384 kbps videoconferencing session, one ISDN-BRI lines to location C for a web-browsing software demonstration, and leave the other two lines unallocated. Using a computer interfaced to the control unit via the communication circuit, such allocation can be made with a command line interface (e.g., a "switch source to destination" command, e.g., switch lines 1–3 to cr13ne) or with a graphical user interface (e.g., having an icon for each unswitched communication line and an icon for each location and clicking on and dragging unswitched communication line(s) to location(s)). Using a telephone interfaced to the control unit via the communication circuit, such allocation of line(s) to locations can be made with any number of commonly used telephone interfaces, such as an audible menu-driven interface (e.g., "press 1 to allocate communication lines," "select a communication line to allocate," "select a location for that line to be allocated to," "press 8 to know the location currently accessing the ISDN lines," "press 8 to know the status of the automatic ISDN switch," etc.) or having particular number codes cause each action (e.g., pressing 1-1-1 causes the switch to route the first communication line to the first location, pressing 1-1-2 causes the switch to route the first communication line to the second location, pressing 1-2-1 causes the switch to route the second communication line to the first location, pressing 1-2-2 causes the switch to route the second communication line to the second location, pressing 9-9 causes the switch to route the lines to none of the locations, etc.). Such commands via telephone, computer, etc. can be expected to be carried out virtually immediately or, in the alternative, at some other date and/or time by addition of other parameter(s) to the command, which would allow scheduling of resources in advance (e.g., a "switch source to destination on date at time" command).

The control units herein will differ from embodiment to embodiment, in terms of circuitry and processing power required. For example, in the embodiment of FIG. 7, the determination of the desired location from the lines 186A–186F is very straightforward—virtually no circuitry at all is needed to determine the location and communicate that to the switch bank 180. However, in the case of other embodiments, e.g., the telephone interface and computer interface embodiments, the control unit will need additional circuitry and processing power. As known to those in the art, such additional processing power can be provided by any number of processors in circuit communication with the autodetect logic and/or the communications circuitry, e.g., programmable logic controllers (PLCs), PICs, microcontrollers, microprocessors with associated logic and memory, etc. In all of these examples herein, and for every embodiment and alternative, the control unit merely needs to be provided with suitable interface hardware circuitry and programmed to respond to each command. Telephone embodiments will preferably need to be able to respond to buttons being pressed or voice commands. This might be implemented with the control unit providing DTMF or other button decoding or with the PBX system doing most of the work and passing commands to the control unit via the communications link. The computer embodiments might be implemented with the computer communications device acting as a simple terminal passing commands back and forth to and from the control unit acting as a terminal host, or with an elaborate computer program executing on the computer communications device and the control unit acting as merely an extension of that computer and its program, or anything in between those two extremes. Given the present disclosure, implementation of each control unit is believed to be within the capabilities of those skilled in the art.

The control unit can also perform the function of determining (or allowing a user to communicate) whether permission has been granted for at least one communication line to be used at a particular location at a particular time. For example, before allowing input from any of the communications devices, e.g., key pad, computer, telephone, palm-top, pendant, etc., the control unit can be configured and programmed to require that a password be input through that device or another device. Also, the permission function can be added to any of the autodetect embodiments. For example, recall that in the embodiment of FIGS. 7–9 the control unit automatically generates the location signal responsive to insertion of an ISDN connector into an ISDN receptacle. In the alternative, one might add to the embodiment of FIGS. 7–9 a communications circuit of FIG. 12 providing a communications link to each location via telephones and associated telephone wiring. Although the control unit would generate the location signal in response to the connector being inserted into the receptacle, it would not do so automatically; rather the control unit would wait for some form of permission indicator before generating the location signal, e.g., the control unit would wait for a user to pick up one of the handsets, dial an extension, and actuate a specific series of buttons on the telephone keypad before generating the location signal. Thus, the control unit can be configured to determine whether permission has been granted for the proposed use of the communication signals. Additionally, as is apparent from this embodiment, the control unit (in this and all embodiments) can automatically generate the location signal, thereby causing the switch bank to switch the lines, or in the alternative, the control unit can require that some other action be performed before generating the location signal. In the former automatic configuration, the location signal can comprise merely an indication of the desired location. In the latter configuration, the location signal would need an additional line (e.g., a strobe signal or a data valid signal) to command the switch bank to switch the communications lines.

The control unit can also perform the function of providing system status, e.g., whether ISDN lines are already in use, where the ISDN lines are in use, who accessed the system to use ISDN lines, whether anyone has scheduled use of lines at a particular date and time, etc. Such status indications can be transmitted by the control unit in any number of ways, e.g., having a digitized or synthesized voice present status information using a telephone line; leaving voice mail containing status information to someone using a digitized or synthesized voice either using the PBX directly or via telephone lines; sending an e-mail message containing status information to someone via a computer network or via an intranet or via the Internet; sending status information via the communications devices discussed herein or via a display associated with any of the communications devices discussed herein, etc.

The "communications line(s)" referred to herein can refer to ISDN U interface lines, other ISDN lines, fiber optic lines, Ethernet lines, asynchronous transfer mode (ATM) lines, digital subscriber line (DSL) lines—virtually any type of communications link that should be terminated at a single location would benefit from the present invention. The term "user" is used broadly herein as meaning a user of videoconferencing equipment as well as a user of the control unit and/or switch bank of the present invention.

Using the automatic switch of the present invention is very straightforward. First the switch is connected to unswitched communications lines, switched communications lines, circuitry, communications devices, and power source in accordance with the above discussion. Then the videoconferencing equipment and any communications devices are connected to appropriate power and signal lines as should be apparent from the particular embodiment and implementation being used.

Use of the various autodetect embodiments should be apparent after the foregoing discussion. For example, using the breakout cable of FIG. 8c, one merely inserts connector 119 into the ISDN receptacle 110 in the desired location and the three ISDN-BRI lines 48a–48c are automatically switched to lines 116a–116c. One inserts the three other connectors 118a–118c into the network interface 24 to complete the breakout of the hybrid lines. As another example, using the key card autodetect embodiments, one merely swipes the key card through the card reader located at the desired location and the three ISDN-BRI lines 48a–48c are automatically switched to that location. As yet another example, using the keypad autodetect embodiments, one merely types in the correct code using the keypad located at the desired location and the three ISDN-BRI lines 48a–48c are automatically switched to that location. As a final example, using the telephone button-based autodetect embodiments, one merely picks up the handset and dials a particular extension using the telephone located at the desired location and the three ISDN-BRI lines 48a–48c are automatically switched to that location. In general, one merely performs the act(s) at the location that causes the control unit to generate the location signal, which in turn causes the switch bank to switch the communications lines as desired.

Use of the communications embodiments should also be apparent after the foregoing discussion. For example, using computer or palm-top embodiments, one merely types one or more commands or actuates one or more icons on the computer interfaced to the control unit via the communications circuit to switch or allocate communications lines to selected locations. As another example, using the telephone button-based embodiments, one merely picks up the handset and dials a particular extension using the telephone interfaced to the control unit via the communications circuit and presses buttons (e.g., either codes representing commands or in response to audible prompts) to switch or allocate communications lines to selected locations. In general, one merely communicates to the control unit with one or more communication devices the desired action, thereby causing the control unit to generate the location signal, which in turn causes the switch bank to switch the communications lines as desired.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, any combination and permutation of the one or more communications links and devices from each embodiment can be combined, for example autodetection at each location via a telephone extension, a keypad on the switch enclosure, and computer access via an RS-232 link. As another example, there can be more than one communication device at each location or different devices at the various locations, for example, a keypad in location A and key card reader in location C. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. An automatic ISDN switch for connection to at least one ISDN-BRI line and a plurality of different videoconferencing locations for automatically switching the at least one ISDN-BRI line to one videoconferencing location of the plurality of different videoconferencing locations, comprising:

(a) a control unit for being placed in circuit communication with each of the plurality of different videoconferencing locations, said control unit generating a location signal corresponding to a particular one videoconferencing location of the plurality of videoconferencing locations; and (b) a switch bank in circuit communication with said control unit for receiving the location signal, for being placed in circuit communication with the plurality of different videoconferencing locations, and further for being placed in circuit communication with the at least one ISDN-BRI line, said switch bank automatically switching the at least one ISDN-BRI line to the particular one videoconferencing location of the plurality of videoconferencing locations corresponding to the location signal generated by the control unit; and (c) wherein each of the plurality of different videoconferencing locations comprises an ISDN receptacle, each of said plurality of ISDN receptacles for being placed in circuit communication with said control unit; and (d) wherein said control unit generates the location signal corresponding to the particular one videoconferencing location responsive to an ISDN connector being inserted into the ISDN receptacle in the particular one videoconferencing location; and (e) wherein said control unit automatically generates the location signal corresponding to the particular one videoconferencing location responsive to an ISDN connector being inserted into the ISDN receptacle in the particular one videoconferencing location.

2. An automatic ISDN switch for connection to at least one ISDN-BRI line and a plurality of different videoconferencing locations for automatically switching the at least one ISDN-BRI line to one videoconferencing location of the plurality of different videoconferencing locations, comprising:

(a) a control unit for being placed in circuit communication with each of the plurality of different videoconferencing locations, said control unit generating a location signal corresponding to a particular one videoconferencing location of the plurality of videoconferencing locations; and (b) a switch bank in circuit communication with said control unit for receiving the location signal, for being placed in circuit communication with the plurality of different videoconferencing locations, and further for being placed in circuit communication with the at least one ISDN-BRI line, said switch bank automatically switching the at least one ISDN-BRI line to the particular one videoconferencing location of the plurality of videoconferencing locations corresponding to the location signal generated by the control unit; and (c) wherein each of the plurality of different videoconferencing locations comprises an ISDN receptacle, each of said plurality of ISDN receptacles for being placed in circuit communication with said control unit via at least first and second conductors; and (d) wherein the insertion of an ISDN connector into the ISDN receptacle in the particular one videoconferencing location significantly reduces the impedance between the first and second conductors for the particular one videoconferencing location; and (e) wherein said control unit generates the location signal corresponding to the particular one videoconferencing location responsive to detecting the change in the impedance between the first and second conductors for the particular one videoconferencing location; and (f) wherein said control unit automatically generates the location signal corresponding to the particular one videoconferencing location responsive to detecting the change in the impedance between the first and second conductors for the particular one videoconferencing location.

3. An automatic ISDN switch for connection to at least one ISDN-BRI line and a plurality of different videoconferencing locations for automatically switching the at least one ISDN-BRI line to one videoconferencing location of the plurality of different videoconferencing locations, comprising:

(a) a control unit for being placed in circuit communication with each of the plurality of different videoconferencing locations, said control unit generating a location signal corresponding to a particular one videoconferencing location of the plurality of videoconferencing locations; and (b) a switch bank in circuit communication with said control unit for receiving the location signal, for being placed in circuit communication with the plurality of different videoconferencing locations, and further for being placed in circuit communication with the at least one ISDN-BRI line, said switch bank automatically switching the at least one ISDN-BRI line to the particular one videoconferencing location of the plurality of videoconferencing locations corresponding to the location signal generated by the control unit; and (c) wherein each of the plurality of different videoconferencing locations comprises an ISDN receptacle, each of said plurality of ISDN receptacles for being placed in circuit communication with said control unit via at least first and second conductors; and (d) wherein the insertion of an ISDN connector into the ISDN receptacle in the particular one videoconferencing location causes a change in the electrical relationship between the first and second conductors for the particular one videoconferencing location; and (e) wherein said control unit generates the location signal corresponding to the particular one videoconferencing location responsive to detecting the change in the electrical relationship between the first and second conductors for the particular one videoconferencing location; and (f) wherein said control unit automatically generates the location signal corresponding to the particular one videoconferencing location responsive to detecting the change in the electrical relationship between the first and second conductors for the particular one videoconferencing location.

4. An automatic ISDN switch for automatically switching at least one signal input, said signal input corresponding to at least one ISDN-BRI line, to at least one particular signal output of a plurality of signal outputs, each of said signal outputs corresponding to one videoconferencing location of a plurality of different videoconferencing locations, comprising:

(a) a control unit, said control unit generating a location signal corresponding to a particular one videoconferencing location of the plurality of videoconferencing locations; and (b) a switch bank in circuit communication with the at least one signal input and with the plurality of signal outputs, and further in circuit communication with said control unit for receiving the location signal, said switch bank automatically switching the at least one signal input to the at least one particular signal output of the plurality of signal outputs corresponding to the location signal generated by the control unit; and (c) wherein said control unit generates the location signal corresponding to the particular one videoconferencing location responsive to an ISDN connector being inserted into an ISDN receptacle in the particular one videoconferencing location; and (d) wherein said control unit automatically generates the location signal corresponding to the particular one videoconferencing location responsive to an ISDN connector being inserted into the ISDN receptacle in the particular one videoconferencing location.

5. An automatic ISDN switch for automatically switching at least one signal input, said signal input corresponding to at least one ISDN-BRI line, to at least one particular signal output of a plurality of signal outputs, each of said signal outputs corresponding to one videoconferencing location of a plurality of different videoconferencing locations, comprising:

(a) a control unit, said control unit generating a location signal corresponding to a particular one videoconferencing location of the plurality of videoconferencing locations; and (b) a switch bank in circuit communication with the at least one signal input and with the plurality of signal outputs, and further in circuit communication with said control unit for receiving the location signal, said switch bank automatically switching the at least one signal input to the at least one particular signal output of the plurality of signal outputs corresponding to the location signal generated by the control unit; and (c) wherein each of the plurality of different videoconferencing locations comprises an ISDN receptacle, each of said plurality of ISDN receptacles for being placed in circuit communication with said control unit via at least first and second conductors; and (d) wherein the insertion of an ISDN connector into the ISDN receptacle in the particular one videoconferencing location significantly reduces the impedance between the first and second conductors for the particular one videoconferencing location; and (e) wherein said control unit generates the location signal corresponding to the particular one videoconferencing location responsive to detecting the change in the impedance between the first and second conductors for the particular one videoconferencing location; and (f) wherein said control unit automatically generates the location signal corresponding to the particular one videoconferencing location responsive to detecting the change in the impedance between the first and second conductors for the particular one videoconferencing location.

6. An automatic ISDN switch for automatically switching at least one signal input, said signal input corresponding to at least one ISDN-BRI line, to at least one particular signal output of a plurality of signal outputs, each of said signal outputs corresponding to one videoconferencing location of a plurality of different videoconferencing locations, comprising:

(a) a control unit, said control unit generating a location signal corresponding to a particular one videoconferencing location of the plurality of videoconference locations; and (b) a switch bank in circuit communication with the at least one signal input and with the plurality of signal outputs, and further in circuit communication with said control unit for receiving the location signal, said switch bank automatically switching the at least one signal input to the at least one particular signal output of the plurality of signal outputs corresponding to the location signal generated by the control unit; and (c) wherein each of the plurality of different videoconferencing locations comprises an ISDN receptacle, each of said plurality of ISDN receptacles for being placed in circuit communication with said control unit via at least first and second conductors; and (d) wherein the insertion of an ISDN connector into the ISDN receptacle in the particular one videoconferencing location causes a change in the electrical relationship between the first and second conductors for the particular one videoconferencing location; and (e) wherein said control unit generates the location signal corresponding to the particular one videoconferencing location responsive to detecting the change in the electrical relationship between the first and second conductors for the particular one videoconferencing location; and (f) wherein said control unit automatically generates the location signal corresponding to the particular one videoconferencing location responsive to detecting the change in the electrical relationship between the first and second conductors for the particular one videoconferencing location.

\* \* \* \* \*